US011695745B2

(12) United States Patent
Blank et al.

(10) Patent No.: US 11,695,745 B2
(45) Date of Patent: *Jul. 4, 2023

(54) AUTOMATED DMARC DEVICE DISCOVERY AND WORKFLOW

(71) Applicant: ValiMail Inc., San Francisco, CA (US)

(72) Inventors: Seth Joshua Blank, San Francisco, CA (US); Ashley Duane Wilson, San Francisco, CA (US); Peter Martin Goldstein, San Francisco, CA (US); Jack William Abbott, Parker, CO (US); Robert Benjamin Barclay, Thornton, CO (US)

(73) Assignee: ValiMail Inc., San Francisco, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/371,718

(22) Filed: Jul. 9, 2021

(65) Prior Publication Data

US 2022/0174052 A1 Jun. 2, 2022

Related U.S. Application Data

(63) Continuation of application No. 17/155,092, filed on Jan. 22, 2021, now Pat. No. 11,171,939.

(Continued)

(51) Int. Cl.
*H04L 9/40* (2022.01)

(52) U.S. Cl.
CPC .............. *H04L 63/08* (2013.01); *H04L 63/18* (2013.01)

(58) Field of Classification Search
CPC ....... H04L 63/08; H04L 63/18; H04L 63/105; H04W 12/06

(Continued)

(56) References Cited

U.S. PATENT DOCUMENTS 8,132,250 B2   3/2012 Judge et al.
9,143,476 B2 * 9/2015 Dreller ............... H04L 51/226

(Continued)

FOREIGN PATENT DOCUMENTS

EP          1720123 A1   11/2006
WO    WO 2014/131058 A2    8/2014

OTHER PUBLICATIONS

Andersen, K. et al., "The Authenticated Received Chain (ARC) Protocol," Internet Engineering Task Force (IETF), Request for Comments: 8617, Jul. 2019, 35 pages, ISSN: 2070-1721.

(Continued)

*Primary Examiner* — Benjamin A Kaplan
(74) *Attorney, Agent, or Firm* — Fenwick & West LLP

(57) ABSTRACT

A third-party server, delegated by organizations to manage application environment, may maintain a plurality of guided workflow plans. At least one of the guided workflow plans may include one or more steps associated with setting up an interaction control policy. The third-party server may receive an interaction report associated with the organization. The interaction report may include metadata of one or more devices that interacted with other devices. The third-party server may identify a particular device to which existing interaction control policies of the organization are inapplicable. The third-party server may search for additional out-of-band information of the particular device using the metadata in the interaction report. The third-party server may select an applicable guided workflow plan for setting up an applicable interaction control policy for the particular device. A guided workflow may be presented via a graphical user interface according to the applicable guided workflow plan.

20 Claims, 20 Drawing Sheets

Related U.S. Application Data

(60) Provisional application No. 63/120,049, filed on Dec. 1, 2020.

(58) Field of Classification Search
USPC .............................................................. 726/5
See application file for complete search history.

(56) References Cited

U.S. PATENT DOCUMENTS

| | | |
|---|---|---|
| 9,686,073 B2 | 6/2017 | Goldstein |
| 9,762,618 B2 | 9/2017 | Goldstein |
| 9,800,402 B2 | 10/2017 | Goldstein |
| 10,122,765 B1 | 11/2018 | Goldstein |
| 10,169,342 B1 | 1/2019 | Ben-Yair et al. |
| 10,229,157 B2 | 3/2019 | Collins et al. |
| 10,237,278 B1 | 3/2019 | Saylor et al. |
| 10,257,231 B2 | 4/2019 | Goldstein |
| 10,897,485 B2 | 1/2021 | Goldstein |
| 2004/0177120 A1 | 9/2004 | Kirsch |
| 2006/0253314 A1 | 11/2006 | Reznichenko et al. |
| 2006/0277259 A1 | 12/2006 | Murphy et al. |
| 2010/0082758 A1 | 4/2010 | Golan |
| 2012/0151486 A1 | 6/2012 | Owen et al. |
| 2014/0047064 A1 | 2/2014 | Maturana et al. |
| 2014/0164281 A1 | 6/2014 | Balkir et al. |
| 2016/0162591 A1 | 6/2016 | Dokania et al. |
| 2016/0171509 A1 | 6/2016 | Fanous et al. |
| 2016/0205106 A1 | 7/2016 | Yacoub et al. |
| 2016/0315969 A1 | 10/2016 | Goldstein |
| 2017/0034100 A1 | 2/2017 | Zink et al. |
| 2017/0083867 A1 | 3/2017 | Saxena et al. |
| 2017/0270128 A1 | 9/2017 | Smith et al. |
| 2018/0048460 A1 | 2/2018 | Goldstein |
| 2018/0302446 A1 | 10/2018 | Goldstein |
| 2018/0332065 A1 | 11/2018 | Gupta et al. |
| 2019/0014180 A1 | 1/2019 | Lawson et al. |
| 2019/0028832 A1 | 1/2019 | Speede |
| 2019/0149342 A1 | 5/2019 | Fynaardt et al. |
| 2019/0334884 A1 | 10/2019 | Ross et al. |
| 2020/0092257 A1 | 3/2020 | Goldstein |
| 2020/0137081 A1 | 4/2020 | Goldstein |
| 2020/0296082 A1 | 9/2020 | Killoran et al. |
| 2021/0067559 A1* | 3/2021 | Coleman ............... H04L 9/3247 |
| 2021/0092118 A1* | 3/2021 | Zahed .................. G06Q 10/107 |
| 2021/0092127 A1 | 3/2021 | Li et al. |

OTHER PUBLICATIONS

Kucherawy, M. et al., "Domain-based Message Authentication, Reporting, and Conformance (DMARC)," Request for Comments: 7489, Mar. 2015, 73 pages, ISSN: 2070-1721.
PCT International Search Report and Written Opinion, PCT Application No. PCT/US2021/014482, dated Aug. 27, 2021, nine pages.
PCT International Search Report and Written Opinion, PCT Application No. PCT/US2021/014481, dated May 3, 2021, 10 pages.
PCT International Search Report and Written Opinion, PCT Application No. PCT/US2021/014483, dated May 3, 2021, 10 pages.
U.S. Appl. No. 17/128,008, filed Dec. 19, 2020, ValiMail Inc.
U.S. Appl. No. 62/970,688, filed Feb. 5, 2020, ValiMail Inc.
U.S. Appl. No. 63/057,814, filed Jul. 28, 2020, ValiMail Inc.
European Patent Office, Extended European Search Report, European Patent Application No. 21206991.8, dated Apr. 28, 2022, seven pages.
Russell, D. "Access Control for Dynamic Virtual Organisations." Electronic Proceedings of the UK E-Science All Hands Meeting, Jan. 1, 2004, pp. 1-8.
U.S. Appl. No. 17/155,089, filed Jun. 14, 2022, 13 pages.

\* cited by examiner

AUTOMATED DMARC DEVICE DISCOVERY AND WORKFLOW

CROSS-REFERENCE TO RELATED APPLICATION

The present application is a continuation of U.S. application Ser. No. 17/155,092, filed Jan. 22, 2021, which claims the benefit of U.S. Provisional Patent Application 63/120,049, filed on Dec. 1, 2020, which is hereby incorporated by reference in its entirety.

TECHNICAL FIELD

The present disclosure generally relates to authentication and authorization in a network application and, more specifically, to generating interaction control policy recommendations based on guided workflow.

BACKGROUND

In network communication, devices can communicate with virtually any other devices. As a result, a device in a network environment needs ways to authenticate another device to determine the identity of the device attempting to establish communications. Spoofing or impersonation has been a challenge for network environments. Systems that are vulnerable to spoofing could allow malicious entities to gain trust and inflict damage to the network environment. Major security breaches need to be prevented in advance in the areas of email, Internet of things (IoT), cloud computing, social media, virtual private networks, etc. When spoofing is prevented, organizations can determine with assurances that a device is what it claims to be and may in turn make determinations on how to treat the device.

A system administrator may determine how devices under the operation of the administrator may respond to other authenticated devices. However, relationships among devices can become quite complex that is beyond the simple example of two-device direct interaction. There can be linear or non-linear multiple-device interactions that are involved. Those complex communication relationships have become increasingly common. For example, in the IoT space, a chain or system of sensors might work together to perform a certain function. Each sensor might have a different manufacturer or deployer. Similarly, in cloud computing, there is commonly a complex relationship between the platform provider and a customer of the platform who is a vendor for multiple businesses. The vendor may serve different end customers. The operation and management of those complex systems can be challenging.

BRIEF DESCRIPTION OF THE DRAWINGS

Figure (FIG. 1A is a block diagram illustrating an example system environment, in accordance with some embodiments.

Figure 1A:
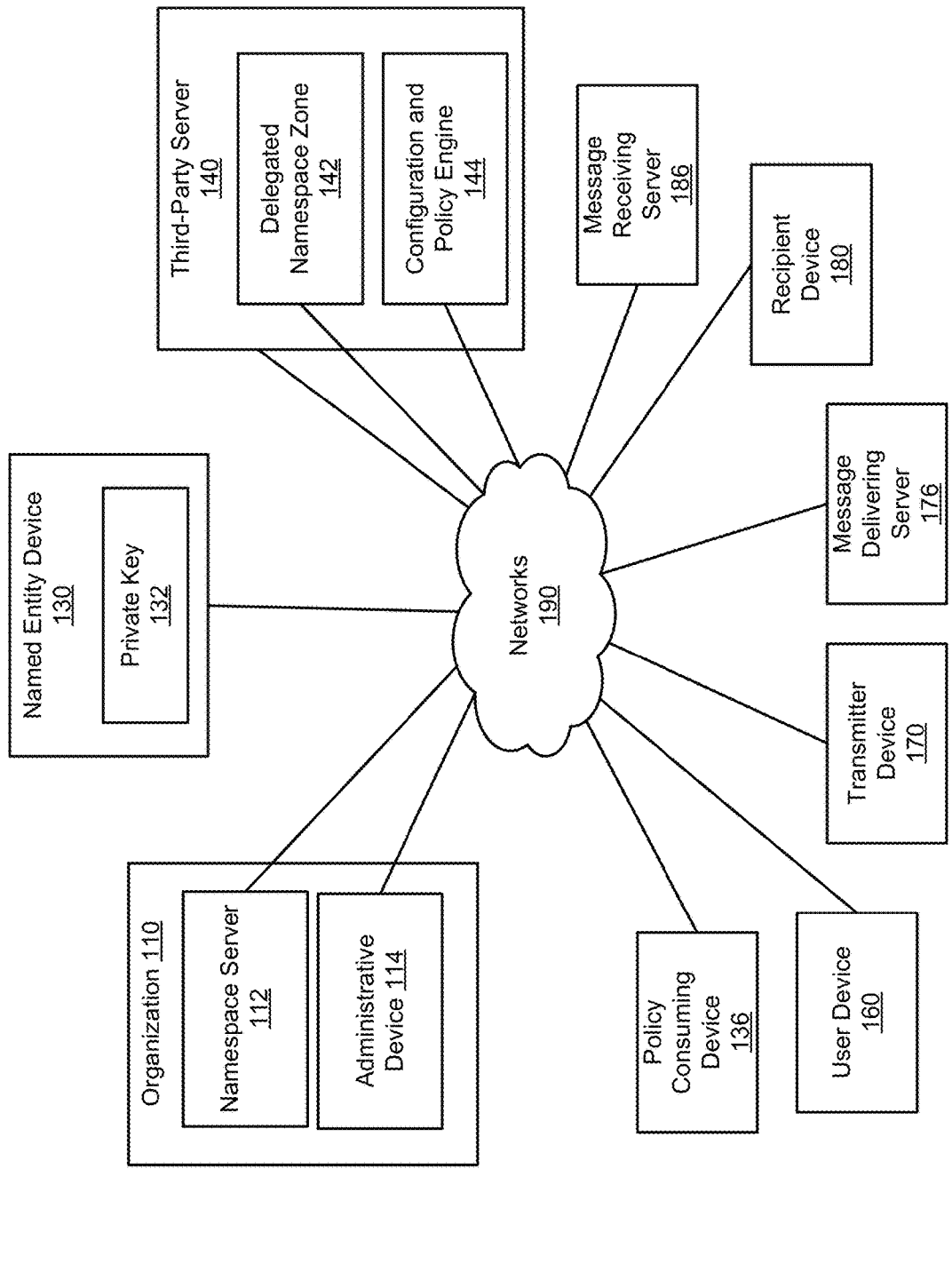
FIG. 1B is a block diagram illustrating an example flowchart for generating configuration recommendations by a third-party server, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An application environment may be a system that involves multiple devices that perform operations and interact with each other for certain purposes. Common examples of application environments include email systems, Internet of things (IoT) systems, cloud computing, etc. In order for a device to determine whether it can interact with another device for a certain action, the device may need to authenticate the other device and determine whether it has the authorization to interact with the other device. The authorization of a device is often determined by the application environment operating organization which may divide participant devices into different roles. The application operating organization may set forth different interaction control policies that regulate the authorization of various participant devices in an application environment. However, new participant devices and existing devices may attempt to perform actions that are not specified in the existing interaction control policies.

In one embodiment, a third-party server, which may be delegated by the application operating organization to manage interaction control policies, may provide a guided workflow to assist the organization to set up new interaction control policies to address the changes in the application environment. By way of example, the third-party server may maintain a plurality of guided workflow plans. The third-party server receives interaction reports associated with the organization. The interaction reports may include metadata of devices that interact with other devices. The third-party server identifies, based on the interaction reports, a particular device to which existing interaction control policies are inapplicable. The third-party server automatically searches for additional information about the particular device to determine the role of the device. In some embodiments, the searching is done by a recursive process. In turn, the third-party server provides a guided workflow for the organization to set up an applicable interaction control policy for the particular device.

Example System Environment

Referring now to figure (FIG. 1A, shown is a block diagram illustrating an example system environment 100 of a process delegation system in which an organization may delegate various tasks to a third-party server that is specialized in performing the tasks, in accordance with some embodiments. Some of the tasks may include sender identification discovery, automated generation of policy recommendations, and setting up interaction control configuration through a guided workflow. The system environment 100 may include an organization 110, a named entity device 130, a third-party server 140 that performs various delegated tasks, a policy consuming device 136, a user device 160, a transmitter device 170, a recipient device 180, and networks 190. In some embodiments, the system environment 100 may also include a message delivering server 176 and a message receiving server 186. In various embodiments, system 100 may include different, additional or fewer components and entities. Also, in some situations, certain components' roles may overlap. For example, the named entity device 130 may serve as the policy consuming device 136, the user device 160, the transmitter device 170, message delivering server 176, the recipient device 180, or the message receiving server 186, depending on the situation. The functionalities of each element may be distributed differently among the elements in various embodiments.

While some of the components in the system environment 100 may at times be described in a singular form while other components may be described in a plural form, the system environment 100 may include one or more of each of the components. For simplicity, multiple instances of a type of entity or component in the system environment 100 may be referred to in a singular form even though the system may include one or more such entities or components. For example, in one embodiment, while the organization 110 and the named entity device 130 may be referred to in a singular form, the third-party server 140 may be a service provider that serves multiple organizations 110, each of which may be in communication with multiple named entity devices 130. Conversely, a component described in the plural form does not necessarily imply that more than one copy of the component is always needed in the environment 100.

An organization 110 may be any suitable entity such as a government entity, a private business, a profit organization or a non-profit organization. An organization 110 may define an application environment in which a group of devices organize and perform activities and exchange information. The system environment 100 may include multiple organizations 110, which may be customers of the third-party server 140 that delegate certain tasks to the third-party server 140. For example, an organization 110 may delegate the policy management and generation of policy recommendations to the third-party server 140.

An organization 110 may have various resources that are under its control. Example resources include a namespace server 112 and an administrative device 114. In some embodiments, some of the named entity devices 130 and some of the policy consuming devices 136 may also be part of the organization's resources. For example, some of the named entity devices 130 and policy consuming devices 136 may be controlled and operated by the organization 110.

In some embodiments, each organization 110 may be associated with its own namespace such as a domain (example.com). Some of the resources may be associated with a unique identifier under the namespace of the organization 110. For example, a device under the control of the organization having a domain example.com may have a DNS (domain name system) identifier (device1.example.com) for identification purposes. The device may be a named entity device 130, a policy consuming device 136 or both.

Figure 11:
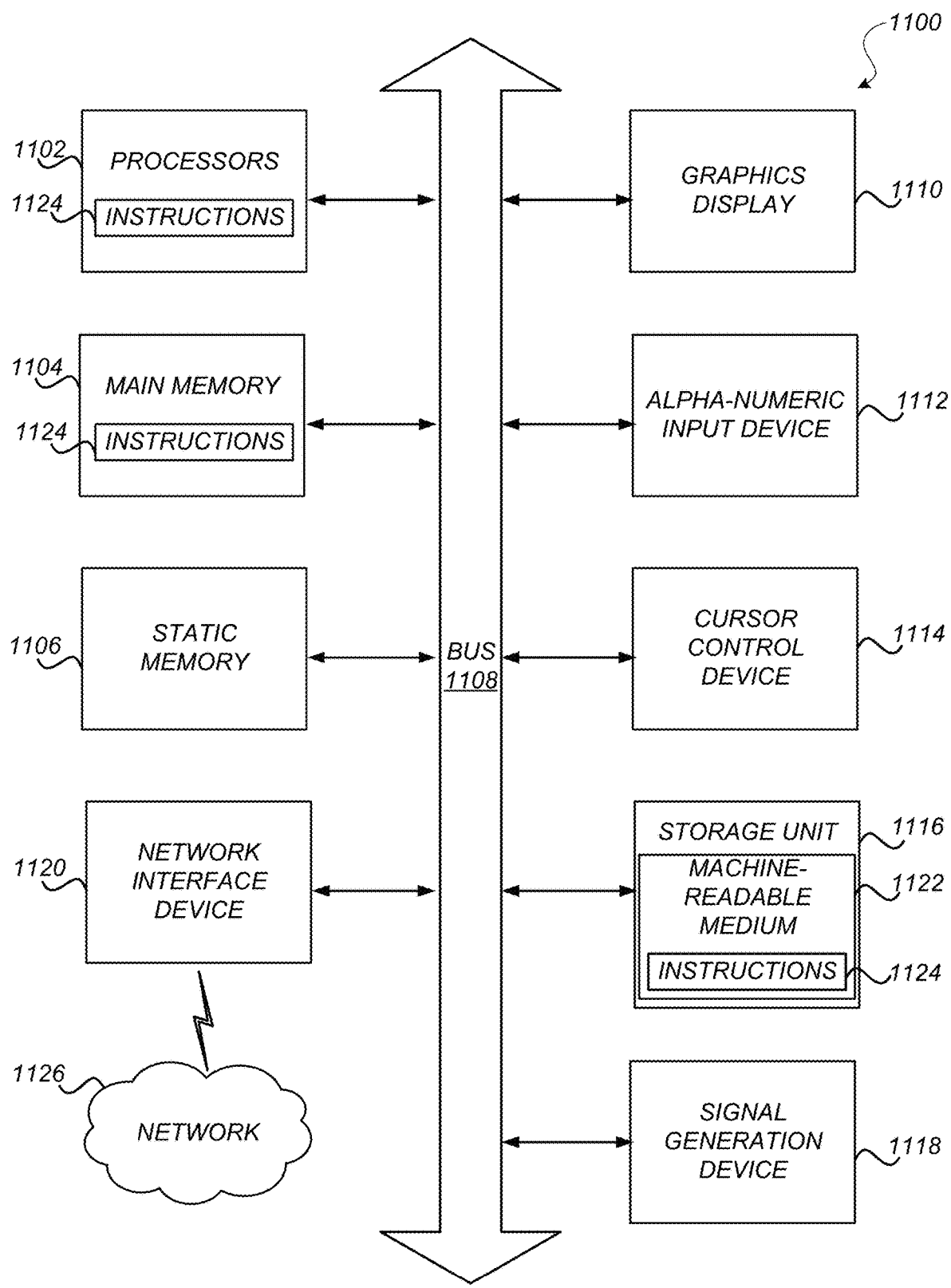
FIG. 11 is a block diagram illustrating components of an example computing machine, in accordance with some embodiments.

To manage its namespace, an organization 110 may include and control a namespace server 112. A namespace server 112 can be a domain owner DNS server. For example, an organization 110 may operate a BIND (Berkeley Internet Name Domain) server. Some or all of the components of a namespace server is illustrated in FIG. 11. The namespace server 112 for an organization 110 operates the namespace of the organization 110 (e.g., the domain of the organization 110), but may delegate a section of the namespace to the third-party server 140. For example, DNS is a distributed system that includes many parties working together to provide a cohesive namespace for the Internet. Starting from the root servers, each branch of the DNS is controlled by a party who may delegate sub-sections of the namespace to other parties. A namespace server 112 associated with an organization 110 may store DNS records for use in a DNS system, manage namespace for the domain name associated with the organization 110, delegate one or more sub-domains to other servers that can be authoritative, and answer queries about the namespace of the domain. A namespace server 112 may store multiple DNS records for a particular domain, such as an A record (address record), MX record (mail exchange record), and so on.

By way of example, an organization 110 named "Example Corp" that operates various devices (each may be an example of a named entity device 130 and/or a policy consuming device 136) may have a website located at www.example.com. The "com" portion of the namespace is maintained by a top-level domain nameserver, which delegates (via a name server (NS) record) the management of the namespace "example.com" to Example Corp. Example Corp is responsible for maintaining the records under example.com, including www.example.com. Since the namespace may be many layers deep, Example Corp may organize its device identities under a specific branch of the DNS, such as "_devices.example.com". A pattern for identifying devices by serial and model, organized under the namespace example.com, may be serial.model._devices.example.com, or 123.sensor._devices.example.com.

In some embodiments, an organization 110 may divide different branches of its namespace for different types of entities and devices. For example, natural persons may be under the namespace _persons.example.com while devices are under the namespace _devices.example.com. In another approach, the named entities may be assigned to a single branch, such as authentication.example.com. The wording used in the namespace can be arbitrary and does not always need to correspond to or have any relationship with the type of the named entity device 130.

DNS provides various types of records, including name-to-IP address resolution. DNS also has the ability to host specialized record types for public keys and certificates (DANE (DNS-based Authentication of Named Entities) or TLSA (transport layer security authentication) record type, RFC 6698). DKIM (Domain Keys Identified Mail) (RFC 6376) is another type of record that puts public keys in freeform TXT records.

An organization 110 may include one or more administrative devices 114 that manage the resources and namespace of the organization 110. Some or all of the components of an administrative device 114 is illustrated in FIG. 11. An administrative device 114 may be operated by an administrator, whether it is a robotic agent or a natural person. An administrative device 114 may manage identity records of named entity devices 130 and policy consuming devices 136 that are associated with the organization 110. An administrative device 114 may also manage the configuration of various tasks that may be delegated to the third-party server 140, such as secure message distribution, encrypted device update distribution, namespace management, authentication services, policy management, and policy recommendations, which may be performed by various engines discussed in further detail in FIG. 2. For example, an administrative device 114 may provide configuration settings to the third-party server 140 to allow the third-party server 140 to manage configurations on behalf of the organization 110 and recommend new or modified configurations to address changes in the application environment. An administrative device 114 may also change the settings associated with various components and resources in the organization 110.

An organization 110 may create an application environment for various devices to perform activities and interact with each other. The application environment in this context may be distinguished from software applications (software programs) that may also be mentioned in this disclosure. An application in this context may be a system that involves multiple participants that may authenticate and trust one another. The participants may perform certain common operations and interact with each other. Certain actions may be autonomous or may be decided by individual participants, while other actions may be defined by the policies set forth by the organization 110. A participant device may communicate with the third-party server 140, which is delegated by the organization 110 to manage the policies of the organization 110. Participant devices of an application environment may include named entity devices 130 and policy consuming devices 136. Some of the devices may serve both roles. Examples of application environments may include distributed applications with clients and servers, sensor and actuator systems, camera systems, email systems, cloud computing systems, and recording systems. Other systems are also possible.

In the system environment 100, there can be multiple independent organizations 110, each of which may be in communication with various kinds of named entity devices 130. Various organizations 110 may be of different natures and provide different products and services to their customers. The organizations 110 may be customers of the third party which operates the third-party server 140 and may delegate the third-party server 140 to perform different tasks to various extents. Each organization 110 may specify a different set of rules and policies when interacting with the third-party server 140 and in controlling how the third-party server behaves when performing the delegated tasks.

A named entity device 130 may be a device that is associated with a named entity that has one or more identity records on the Internet. The identity records are often stored and published in a namespace system such as DNS. An entity may be a natural person with a smartcard-based identity, a device with a private key, or an instance of an application, service, or microservice with a name in the DNS. The identity record may include the identity information of the named entity device 130 or a version of the identity (such as the hash of the identity) to preserve the privacy of the named entity associated with the named entity device 130. Examples of named entities may include natural persons (e.g., employees, outside contractors, administrators), properties, Internet of things (IoT) devices, equipment, machines, virtual objects, software applications, services, services, or any suitable objects or concepts that have names for identification. The named entity device 130 may be controlled manually by a person or autonomously by a machine.

By way of example, a named entity device 130 may be a roadside beacon (which may be an IoT device) with an identity record in a DNS zone. The roadside beacon may broadcast signed messages that provide warnings of dangerous road conditions to autonomous vehicles. In this case, an organization 110 may be a traffic regulating entity that also receives messages from the roadside beacon. In another example, a named entity device 130 may be a smart-home appliance that can automatically order an item from a retailer, which is another example of an organization 110. In a third example, a named entity device 130 may be a user device 160 that has a registered account with an organization 110. The implementations and use cases of the environment 100 are not limited to the explicit examples discussed in this disclosure.

Various named entity devices 130 may have different relationships with an organization 110 and may establish connections with more than one organization 110. In one example, a named entity device 130 may be made and operated by an organization 110. For example, an industrial organization may operate various sensors in a facility. The sensors may each be an IoT device that is an example of a named entity device 130. In the cases where a named entity device 130 is part of an organization's resources, the named entity device 130 may be associated with an identity record under the namespace of the organization 110. For example, the named entity device 130 may be associated with a unique identifier "123424.sensor._devices.example.com", controlled by the organization 110 Example Corp. In some cases, a named entity device 130 is not part of the organization 110 but may communicate with a policy consuming device 136 that is under the control of the organization 110 or that acts under one or more policies set forth by the organization 110. A named entity device 130 may be registered with the organization 110 and has one or more roles associated with one or more policies set by the organization 110. For example, a sensor may be registered with the organization 110 as an authorized sender to provide data to autonomous vehicles' computing devices (examples of policy consuming devices 136) that are controlled by or otherwise associated with the organization 110.

A named entity device 130 may have some or all of the components of an example computing device illustrated in FIG. 11. The types of components equipped in a named entity device 130 may vary, depending on its type. A named entity device 130 may be a server computer, a personal computer, a portable electronic device, a wearable electronic device, an IoT device (e.g., a sensor), smart/connected appliance (e.g., a refrigerator), dongle, etc. An IoT device may also be referred to as an Internet-connected device or a network-connected device. The processing power of named entity devices 130 may vary and may be limited for certain types. For example, certain specialized IoT devices may be low-power devices that have limited processing power to reduce cost and power consumption. Certain specialized IoT devices may also be pre-programmed with certain computer code that enables the devices to communicate using certain communication protocols (e.g., Narrowband IoT or RFCOMM (radio frequency communication) over Bluetooth, but not a complete Internet protocol suite.)). In some embodiments, some IoT devices may include a memory that can store a limited set of basic instructions, but may not have sufficient computing capability to dynamically determine context-specific policies for a given situation. Those devices may rely on another device such as the third-party server to perform computations dynamically for the devices.

In some embodiments, a named entity device 130 may include a private key 132 and a corresponding public key that are generated based on PKI (public key infrastructure). The private-public key pair may be used to authenticate the named entity device 130. For example, the named entity device 130 may generate a digital signature by encrypting a message sent from the named entity device 130 using the private key 132. A party in communication with the named entity device 130 may authenticate the message sender using the public key of the named entity device 130. The private-public key pair may also be used to encrypt messages to be sent to the named entity device 130. For example, the message may be encrypted with the public key of the named entity device 130 and the device, upon receipt of the encrypted message, may use the private key to decrypt the message.

The public key may be saved in a publicly accessible source such as a namespace server (e.g., DNS). For example, the public key may be stored on the named entity device 130 and published in a namespace record (e.g., DNS record) at a location which may be referred to as the device identity name. In some embodiments, both the private key 132 and the corresponding public key are saved in the named entity device 130. The private key 132 may be saved in a hardware secure element of the named entity device 130 such as a TPM (trusted platform module). The hardware secure element safeguards the private key 132 and performs encryption and decryption functions. The hardware secure element may be a secure cryptoprocessor chip. In some embodiments, the safeguard of the private key 132 and the cryptographic functions may also be performed by software.

The third-party server 140 is a computing server that provides various services on behalf of the organization 110 and the named entity device 130. The third-party server 140 may also be referred to as a delegated server. The term "third party" may be viewed from the perspective of the organization 110, which may delegate certain tasks and services to another company, which has the expertise to perform the tasks and services. For example, the organization 110 may be a customer of the third-party server 140. The services provided by the third-party server 140 may include managing policies for an organization 110, recommending new policies to an organization 110, authentication responses on behalf of organizations 110, policy distribution on behalf of organizations 110, secure software distribution to named entity devices 130, secure information distribution to policy consuming devices 136, and other tasks that may be authentication and authorization of various named entity devices 130 and policy consuming devices 136, such as IoT devices. In one embodiment, an organization 110 may integrate certain processes or services provided by the third-party server 140 via an API (application programming interface), which allows the third-party server 140 to inspect some of the messages directed to or in transit in the organization 110 and enables the third-party server 140 to apply various policies after receiving the messages. Some examples of services that may be performed by the third-party server 140 are discussed in further detail below with reference to FIG. 2.

Some or all of the components and hardware architecture of a third-party server 140 are illustrated in FIG. 11. The third-party server 140 may be a server computer that includes software that is stored in memory and one or more processors (general processors such as CPUs, GPUs, etc.) to execute code instructions to perform various processes described herein. The third-party server 140 may also be a pool of computing devices that may be located at the same geographical location (e.g., a server room) or be distributed geographically (e.g., cloud computing, distributed computing, or in a virtual server network).

The third-party server 140 may maintain a namespace zone 142 that is delegated by an organization 110. The namespace zone 142 may be referred to as a delegated namespace zone 142. The delegated namespace zone 142 may be a section of the namespace provided by namespace server 112. The third-party server 140 provides management and maintenance of that section of the namespace. An example delegated namespace zone 142 may be a delegated DNS zone that is hosted by the third-party server 140 on behalf of the organization 110. For example, an organization 110 with the domain "example.com" may delegate the zone of "_devices.example.com." to the third-party server 140 for the third-party server 140 to manage the identity records of certain devices of the organization 110. The delegated namespace zone 142 may include a database that stores identity records of various named entity devices 130.

While in this disclosure the namespace of an organization 110 is described using domain names as examples, other forms of the namespace are also possible. For example, the namespace may be in the form of a file path, XML, Java namespace, uniform resource name, network addresses (e.g., MAC addresses, IP addresses), and other suitable namespace formats. An organization 110 may also design a customized namespace. Various blockchains may also support different namespace formats and the namespace may be reserved for an organization 110 and recorded on a block of the blockchain.

The third-party server 140 may include a configuration and policy engine 144. The configuration and policy engine 144 may determine rules for various participants in an application environment and may also work with an enrichment engine to generate one or more new policy recommendations for the organization 110. The policy recommendations may be generated in the course of managing the operation of an application environment that is governed by the policies of the organization 110. The third-party server 140 may identify new devices and entities and automatically determine the potential rules that should apply to those new devices. A policy may be defined and initiated by an organization 110. A policy related to how devices interact with each other may be referred to as an interaction control policy. An organization 110 may transmit the policy setting to or configure the policy setting at the third-party server 140. The configuration and policy engine 144 translates the policy setting to one or more interaction control lists to be distributed to various policy consuming devices 136. Interaction control lists may be a set of rules that define what devices are authorized to interact with a policy consuming device 136 and define how the policy consuming device 136 may behave in certain situations. The configuration and policy engine 144 may determine dynamically one or more context-specific policies that are applicable to a policy consuming device 136. The configuration and policy engine 144 may transmit the determined policies to the policy consuming device 136 as an interaction control list. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy consuming device 136 may be a device associated with a policy consumer that consumes an interaction control list provided by the third-party server 140. A policy consumer is an entity that consumes policy from the third-party server 140. A policy consuming device 136 may be a named entity device 130, but may also be an anonymous device. Also, a policy consumer may be an entity under the direct control of an organization 110 or an entity managed by an unrelated party, with an identity in a managed namespace, like the DNS. The policy consumer may also be a member of the general public, and not represented by a specific named identity. A policy consumer may be the policy consuming device 136 itself, but may also be a part of the policy consuming device 136 that is anonymous. For example, a browser plugin may be a policy consumer that receives interaction control lists but does not have an identity.

Various policy consuming devices 136 may have different relationships with one or more organizations 110 in various situations. In one case, some of the policy consuming devices 136 may be part of the resources of an organization 110. For example, the organization 110 may be a sensor operator that controls a number of sensors in an application environment. In another case, a policy consuming device 136 may be a device whose management falls under a different organization 110 that is not the organization that operates the application environment. For example, an application environment of a podcast system may include a phone and an automobile as participants. The phone may be managed by a phone company and the automobile may be managed by a car manufacturer while the application environment may be managed by a third organization 110 that operates the podcast system. In yet another case, a policy consuming device 136 may be associated with multiple organizations 110 and participate in more than one application. For example, an autonomous vehicle may serve as a policy consuming device 136 that subscribes to a traffic light data service operated by a local government, to traffic and road condition data operated by a real-time traffic conditions provider, and to weather service operated by a private company. Each application environment (e.g., traffic light data, weather service) may have its own rules in terms of authentication and authorization on whether the autonomous vehicle may or may not receive or transmit certain data.

The system environment 100 may also include character-specific devices such as a user device 160, a transmitter device 170, a message delivering server 176, a recipient device 180, and a message receiving server 186. Each of these devices may be a named entity device 130 and/or a policy consuming device 136.

A user device 160 is a computing device that may transmit and receive data via the networks 190. Some or all of the components of a user device 160 is illustrated in FIG. 11. The user device 160 also may be referred to as a client device or an end user device. Various user devices 160 may belong to different parties or may be associated with individual end users. Administrative devices 114, transmitter devices 170, and recipient devices 180 may also be examples of user devices 160. A user device 160 includes one or more applications and user interfaces that may communicate visual, tactile, or audio elements of the applications. The user devices 160 may be any computing devices. Examples of such user devices 160 include personal computers (PC), desktop computers, laptop computers, tablets (e.g., iPADs), smartphones, wearable electronic devices such as smartwatches, or any other suitable electronic devices.

A user may be personnel, an expert, an outside contractor, a customer, or otherwise an end user associated with an organization 110 or someone who is unrelated to any organization 110. The user also may be referred to as a client or an end user and may control a named entity device 130. A user, through a user device 160, may communicate with other components in the system environment 100 in various suitable ways. For example, a user device 160 may include a user-side software application provided by an organization 110 or the third-party server 140. The user device 160 may interact with those components using a graphical user interface (GUI) of the software application. For example, an administrator (an example of a user) may specify the configurations of the authentication rules using a GUI of an application provided by the third-party server 140. An application may be a web application that runs on JavaScript or other alternatives. In the case of a web application, the application cooperates with a web browser to render a front-end interface. In another case, an application may be a mobile application. For example, the mobile application may run on Swift for iOS and other APPLE operating systems or on Java or another suitable language for ANDROID systems. In yet another case, an application may be a software program that operates on a desktop computer that runs on an operating system such as LINUX, MICROSOFT WINDOWS, MAC OS, or CHROME OS. In other cases, a user may communicate with the third-party server 140 by causing an administrative device 114 of an organization 110 to communicate directly to the third-party server 140, for example, via features such as Application Programming Interface (API) or like technologies such as webhooks. In other cases, a user device 160 may be a transmitter device 170 or a recipient device 180. For example, end users may send messages to each other and the messages may be authenticated through information provided by third-party server 140.

In the system environment 100, a transmitter device 170 and a recipient device 180 may be respectively the message transmitter and the message recipient. Messages are not limited to a particular type or format. Messages can be emails, text messages, instant messages, social media messages (e.g., FACEBOOK messages, posts, and TWEETS), RSS feeds, push notifications, Internet packets, data link frames, or any suitable data payloads. Messages may also include data or executable instructions such as software updates, firmware updates, and device configuration data or files. A message described in this disclosure does not always need to be a human-readable or machine-readable text string or communication. A message may also be information represented in a computer-readable form. A message may be a block of data, a payload, an executable set of instructions, human-written text, or any other suitable information that may be carried by one or more packets, data frames, or other suitable units of data, with or without control information, structured or unstructured, encrypted or not, and indexed or not. In some cases, if a message is sent from a named entity device 130, the message may bear the signature of the named entity device 130. Likewise, if a data payload is sent from the third-party server 140, the data payload may be transmitted with the signature of the third-party server 140 for authentication purposes.

Various transmitter devices 170 may be anonymous or may be named entity devices 130 whose identities are defined under different domains or sub-domains. A transmitter device 170 may be an example of named entity device 130 that is under the control of an organization 110. Messages sent from this transmitter device 170 may be authenticated based on the rules set by the organization 110. For transmitter devices 170 that are controlled by an organization 110 that has a domain, e.g., example.com, the identifiers of the transmitter devices 170 may be under the sub-domain such as devices.example.com, whose namespace may be delegated to the third-party server 140. Hence, when a recipient device 180 receives a message, the recipient device 180 may send an authentication query to the namespace server associated with the organization 110. The third-party server 140 may operate part of the namespace related to devices.example.com on behalf of the organization 110. In some embodiments, if a device is communicating with the third-party server 140, the third-party server 140 may also take the roles of transmitter device 170 and recipient device 180.

In some embodiments, a transmitter device 170 and a recipient device 180 may not transmit or receive messages directly through the networks 190. Instead, a message delivering server 176 and a message receiving server 186 transmit and receive messages on behalf of the devices. For example, in the setting of email communications, the message delivery server 176 sends emails on behalf of the transmitter device 170. The message delivery server 176 may include one or more computing systems, which may be configured similarly to the computing system described with reference to FIG. 11. As an example, the message delivery server 176 may be a mailing list server, a bulk mailer provider that sends emails on behalf of a domain, a transactional email system managed by a third-party that sends emails on behalf of a domain, or a security system that scans emails on behalf of a domain. The message delivery server 176 may send the email instead of the named entity device 130 so that the message delivery server 176 may provide additional processing or functionality to the email. In one embodiment, the email sender 114 uses standard mail protocols, such as Simple Mail Transfer Protocol (SMTP). SMTP supports various features. U.S. Pat. No. 9,762,618, entitled "Centralized Validation of Email Senders via EHLO Name and IP address Targeting," patented on Sep. 12, 2017, is incorporated by reference for all purposes. Likewise, in the setting of email communications, a message receiving server 186 may be an email server on the recipient end.

In the setting of IoT device communications, some IoT devices may be equipped with long-range communication capabilities such as LTE or 5G so that the devices can communicate with each other, with transmitter devices 170, and the third-party server 140 directly through the Internet. On the other hand, in some embodiments, some IoT devices may only be equipped with limited communication capability that is confined to a smaller area such as a local area network. In those cases, the IoT devices may rely on message brokers for the communications with transmitter devices 170 and the third-party server 140. In such cases, various message brokers may be examples of message delivering servers 176 and message receiving servers 186.

In various embodiments in this disclosure, for simplicity and unless otherwise specified, the communication between a transmitter device 170 and a recipient device 180 may be described as a message transmitter or a message originator transmitting a message to a message recipient. This description should include the situation where a transmitter device 170 directly sends a message to a recipient device 180 and the situation where a message delivering server 176 and a message receiving server 186 are involved (e.g., in the context of email communication). The authentication may be performed at the recipient device 180 and/or at the message receiving server 186. For simplicity, a message recipient may refer to a policy consuming device 136, a named entity device 130, a recipient device 180 or a message receiving server 186, depending on the situation and the communication protocol used in transmitting the message. A message recipient may also be referred to as an authenticator. Likewise, a message transmitter may refer to a named entity device 130, a transmitter device 170 or a message delivering server 176. In the context of policy consumption, a message transmitter may be a named entity device 130 and a message recipient may be a policy consuming device 136. If the message recipient transmits a second message to another recipient, the first message recipient may be referred to as a named entity device 130 and the second message recipient may be referred to as a policy consuming device 136.

The networks 190 may include multiple communication networks that provide connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), structured query language (SQL). In some embodiments, all or some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. The network 190 may be any communication network that transmits data and signals by any suitable channel media such as wire, optics, waveguide, radio frequency, ID badge with a QR (quick response) code, infrared, or any suitable electromagnetic media. The network 190 may also be a direct communication between two devices. The network 190 can be in any topologies, such as point-to-point, star, mesh, chain, bus, ring, and any other suitable, regular or irregular, symmetric or not, cyclic or acyclic, fixed or dynamic (e.g., certain devices moving) topologies.

Example Message Flow for Configuration Recommendation

Figure 1B:
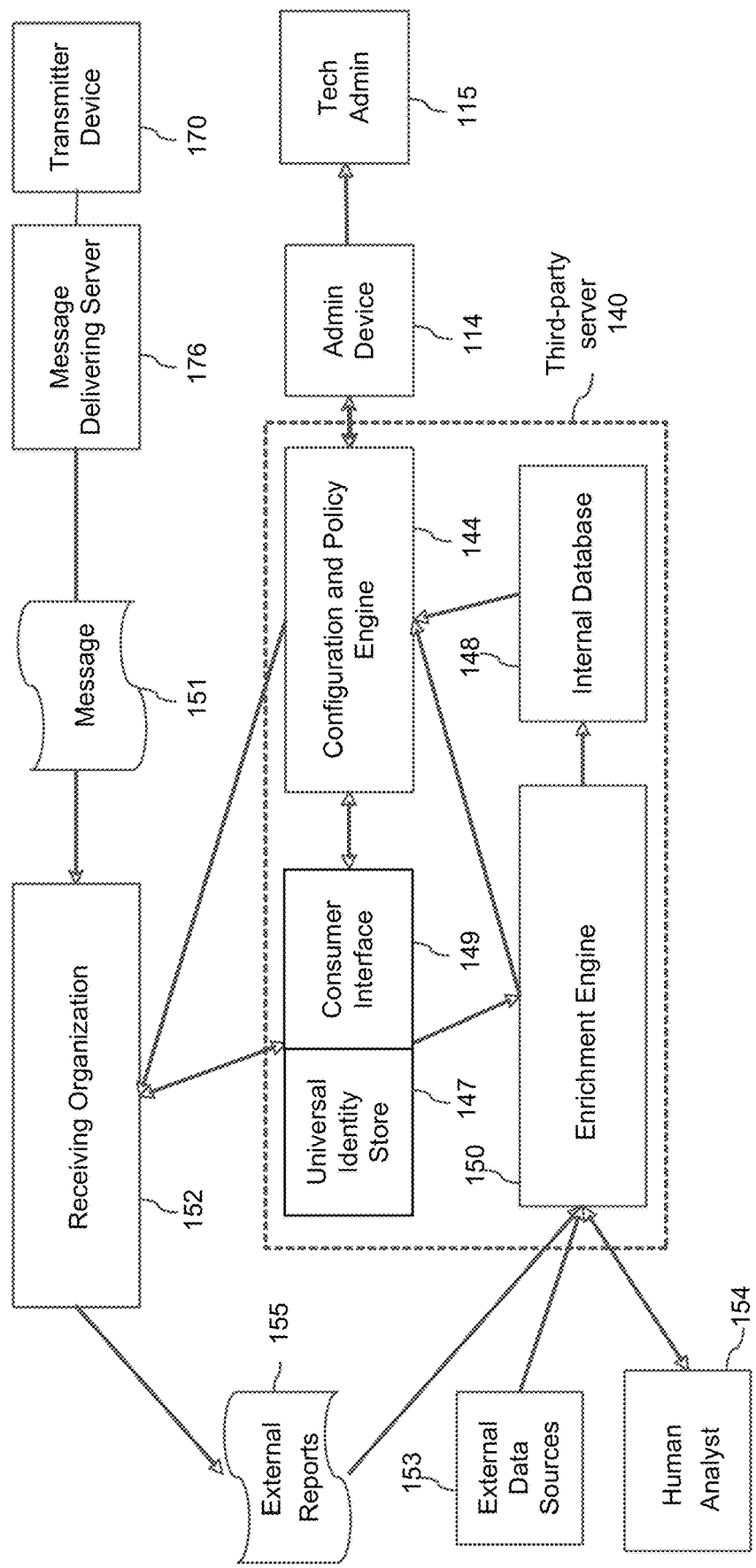

FIG. 1B is a block diagram illustrating an example flowchart for generating configuration recommendations by a third-party server 140, in accordance with some embodiments. The flowchart may correspond to a configuration recommendation process performed in an application environment that is governed by one or more configuration settings set forth by an organization 110, which may delegate the configuration management and recommendation generation to the third-party server 140. The configurations are usually in compliance with one or more interaction control policies. A transmitter device 170 may also be referred to as a message originator. The transmitter device 170 may be affiliated with an organization, which may or may not be the same as the message delivering server 176 (e.g., a sending service) or a receiving organization 152. The transmitter device 170 sends a message 151 using message delivering server 176 (which may be a contracted organization acting on behalf of the transmitter device's organization or a service of the organization), to the receiving organization 152. The receiving organization 152 consults the configuration and policy engine 144—such as by way of the consumer interface 149—for determining, among other things, whether the message is authenticated, whether the message delivering server 176 is authorized to send the message or to perform an attempted action subsequent to the message, whether there is an existing interaction control policy applicable to the situation, and whether the existing configuration needs to be modified.

Configurations related to interaction control are various settings in an application environment that are used to achieve one or more interaction control policies set forth by an organization 110. An application environment, such as in an email and an IoT setting, may involve parties and devices that interact with each other according to policies defined by the operating organization of the environment. Configurations may be of different types and natures to achieve an interaction control policy. For example, an interaction control policy may be a concept that defines how a broad category of devices may act in an environment. One or more configurations may be set to achieve the policy. In one embodiment, a specific example of a policy may define whether a role is authorized to interact with a transmitter device 170 after the transmitter device 170 has been authenticated. More specifically, the transmitter device 170 may attempt to interact with a message recipient. Based on one or more message exchanges, the message recipient has authenticated the transmitter device 170. A policy may define whether or how the message recipient should interact with the authenticated transmitter device 170. A policy setting may be translated into an interaction control list to be sent to the message recipient to provide an instruction to the message recipient on whether or how the message recipient should act. Different configurations may be implemented to achieve the policy. For example, the configurations may set forth procedures in determining whether a device should be classified to the role set forth by the policy, how the transmitter device 170 should be authenticated, etc.

The messages 151 received by the receiving organization 152 are parsed by the configuration and policy engine 144 in accordance with the message-store configurations defined by the engine. These messages may be categorized or marked with additional metadata to add useful context for the recipient, or they may be dropped or deleted outright, moved to a separate portion of the message store (in an email embodiment, to a separate folder, such as spam) or otherwise quarantined or saved for deeper inspection if malicious activity is detected.

The receiving organization 152 provides the enrichment engine 150, via a variety of ways, information about the receipt (authentication pass/fail, message origination data, and other metadata) of messages from the transmitter device 170 via various message delivering servers 176. The information may include external reports 155 (e.g., DMARC reports in the example of emails, various metadata reports in the example of an IoT setting). The receiving organization 152 may also provide information to the enrichment engine 150 in the form of message headers, content, or other relevant metadata or transaction details.

This information provided by the receiving organization 152 to the enrichment engine 150 is used, for example, to identify the organization represented by the transmitter device 170. The information related to the organization may include descriptive attributes of the organization, such as taxonomic classification. This process may be referred to as a sender identification process, which may be used to generate or modify a policy or another configuration. This process may be driven by an automatic correlation against an internal database 148 or external data sources 153. The process may also trigger a guided workflow which offers opportunities for the participation of a human analyst 154. The generation of a guided workflow is discussed in further detail with respect to FIG. 5.

The sender identification process may include identifying the domain name from which the message was sent. For the third-party server 140, sender identification includes identifying the parent organization responsible for the domain name. Identity data may be saved in the universal identity store 147. This is useful in describing the actual relationship between organizations when the responsible party has a domain change.

The enrichment engine 150 also uses this information to determine whether the originating organization should be trusted for the type of communication represented by the analyzed message traffic. This determination takes into account of the taxonomic classification of the sender, and how other similar organizations are related to the sender.

The enrichment engine 150 may determine whether an existing configuration applied to the message. The enrichment engine 150 may further determine whether a configuration used to represent the message delivering server 176 exists and is sufficiently concise. This determination may generate a recommendation to broaden an associated policy, or to narrow the policy, depending on the findings. A configuration that defines the authorization of an authenticated transmitter device 170 in this context may be an example of a policy.

The enrichment engine 150 is capable of generating various forms of outputs based on the foregoing determinations. For example, the enrichment engine 150 may send recommended policy updates to the originating organization or receiving organization 152 in order to describe more accurately the entities that should be trusted for communication.

Additionally, or alternatively, the enrichment engine 150 may update its worldview through the enrichment process and thereby updates its internal database 148. For example, the enrichment engine 150 may find that a change has been made in a message delivering server's technical infrastructure indicating that all originating organizations should make a change to continue operating optimally. In this case, the output may be a recommendation regarding this change sent to all customers of the third-party server 140 which trust the same message delivering server 176 or an organization associated with the transmitter device 170. The enrichment engine 150 may also expose, via API or other ways, the information used to correlate information in the process of identifying senders.

Example Third-Party Server Components

Figure 2:
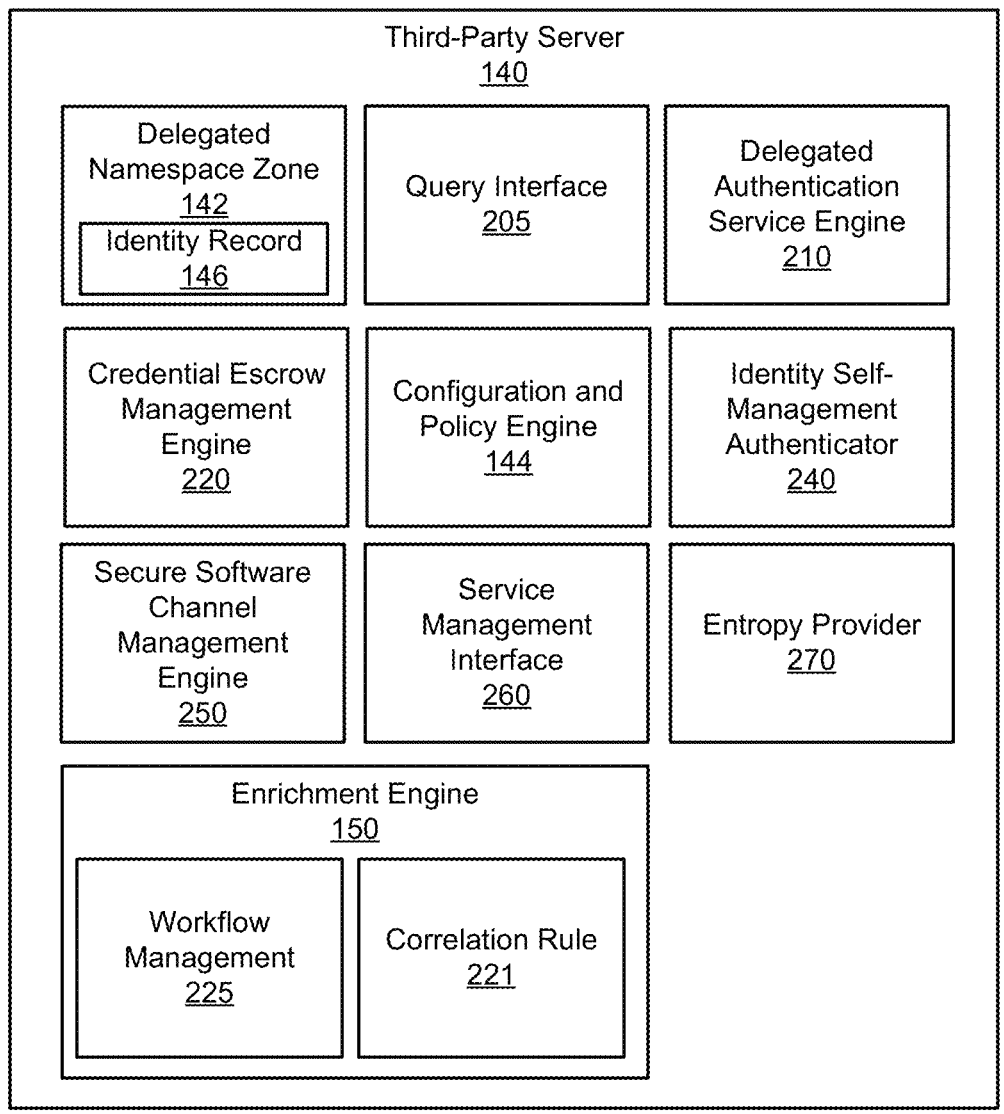
FIG. 2 is a block diagram illustrating various components of an example organization computing server, in accordance with some embodiments.

FIG. 2 is a block diagram illustrating an example third-party server 140, in accordance with some embodiments. In some embodiments, the third-party server 140 may include a delegated namespace zone 142, a query interface 205, a delegated authentication service engine 210, a credential escrow management engine 220, a configuration and policy engine 144, an identity self-management authenticator 240, a secure software channel management engine 250, a service management interface 260, an entropy provider 270, and an enrichment engine 150. In various embodiments, the third-party server 140 may include fewer or additional components, depending on the functionalities of the third-party server 140 in various embodiments. For example, if the third-party server 140 does not perform credential escrow service, the third-party server 140 may not include credential escrow management engine 220. The third-party server 140 also may include different components. The functions of various components in third-party server 140 may be distributed in a different manner than described below. Moreover, while each of the components in FIG. 2 may be described in a singular form, the components may present in plurality.

The components of the third-party server 140 may be embodied as software engines that include code (e.g., program code comprised of instructions, machine code, etc.) that is stored on an electronic medium (e.g., memory and/or disk) and executable by one or more processors (e.g., CPUs, GPUs, other general processors). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 11.

The third-party server 140 may be a computing server that provides various services and performs different tasks on behalf of multiple unrelated organizations 110. Each organization 110 may delegate a section of the organization's namespace to the third-party server 140 as the delegated namespace zone 142. The delegated namespace zone 142 may be used for authentication and authorization. The delegated namespace zone 142 may correspond to a delegated DNS server, a blockchain server, a distributed database server, another suitable server publicly accessible server, or any combination of those servers. If the delegated namespace zone 142 is a delegated DNS, the third-party server 140 is trusted because of the delegated nature of managing DNS zones. Also, the records in DNS may be cryptographically signed to ensure that the records are authoritative and have not been tampered with. If the delegated namespace zone 142 is a namespace under a blockchain, the delegated namespace zone 142 is trusted because the records are tamper-evident.

In various embodiments, the delegated namespace zone 142 may include one or more of the following traits: (1) authenticated (2) delegated and/or (3) able to handle arbitrary content, although not every trait needs to exist in various embodiments. DNS is one example of such a database. First, DNS allows the known entity to manage its own records within the database. Second, DNS enables hierarchical delegation via NS records so that the known entity can provide others authenticated access with permission on its behalf of a subset of the database. For example, an Example Corp is responsible for maintaining all the records under example.com, including www.example.com. Because the namespace may be many layers deep, Example Corp may wish to organize its device identities under a specific branch of the DNS, such as "_devices.example.com". Example Corp may delegate the sub-domain to any party, such as the third-party server 140. Third, arbitrary data, such as text-based, encrypted or not, data can be stored in DNS records. In addition to name-to-IP address, DNS can host specialized record types for public keys and certificates (DANE/TLSA, RFC 8698), and DKIM (RFC 8376), which puts a public key in a freeform TXT record. In some embodiments, encrypted data that is encrypted with the public key of a named entity device 130 may be included in a DNS record for the named entity device 130 to retrieve.

In some embodiments, the delegated nature of a namespace system may allow organizations 110 such as Example Corp to delegate special-purpose parts of their namespace (e.g., DNS hierarchy) to a specialized third-party service provider (3PSP), such as the third-party server 140. For instance, Example Corp may delegate a section of its DNS tree (e.g. "_devices.example.com") to the third-party server 140. The namespace falls under example.com, which may be hosted on computing servers owned by Example Corp, but the _devices.example.com section of the namespace may be delegated by Example Corp to be hosted on the infrastructure of the third-party server 140 as the delegated namespace zone 142.

Although the discussion focuses on the use of DNS as the example distributed database, systems other than DNS may also be used. For example, the Inter-Planetary File System ("IPFS") may also be used. A third alternative example is a blockchain platform supporting application code submissions. While the discussion in this disclosure may focus on the use of DNS for the database, the systems and processes described can be applied to other namespace contexts and implementations. For the rest of the disclosure, even though the descriptions may focus on the DNS, other namespace systems may also apply in a similar manner unless specified otherwise.

The delegated namespace zone 142 may include a plurality of identity records 146. An identity record 146 may be a record that corresponds to a named entity device 130. An identity record 146 may include a unique identifier of a named entity device 130 (e.g., a name), authentication context information, and/or any information that may be used to authenticate the named entity device 130 or verify certain information associated with the named entity device 130. In some embodiments, the identity record 146 may include information that is signed by the private key 132 of the named entity device 130 so that the signer of the information can be easily verified by the device's public key.

While identity records 146 are sometimes discussed in this disclosure with the examples of identifiers or contextual information, the identity record 146 does not need to include any of those examples and may include other types of information that may be directly related to the identity of the named entity device 130. Each organization 110 may include many identity records and may provide a set of those records to the third-party server if the organization 110 decides that the named entity devices 130 correspond to those provided records should be discoverable.

A unique identifier, which may be part of an identity record 146, may be used to identify a named entity device 130 and may be used as a record locator for retrieving the named entity's credential, other contextual authentication information, or other identity information related to the named entity device 130. In some embodiments, an identifier may be in a format under the namespace of the organization 110. An example identifier can be 123.sensor.devices.example.com. In other embodiments, the identifier may also be any text string, arbitrary or not. In some embodiments, the identity records 146 may be saved as key-value pairs in which the identifiers serve as the keys, and the other information are the values. Other formals (e.g., tabular, CSV, tab delimiter, XML, JSON) to store the identity records 146 are also possible.

The query interface 205 may be a communication interface for the third-party server 140 to communicate with various devices in the system environment 100, such as the named entity device 130, the policy consuming device 136, the user device 160, etc. A device may transmit a query to the third-party server 140. The queries may inquire about different kinds of information such as available software or firmware update, device configuration settings, other device updates, policies and interaction control lists, authentication information, authorization information, confidential messages, private messages, or other information. In response, the third-party server 140 may provide encrypted data payloads as the responses to the devices. The encryption may achieve object security so that encryption can be different even for the same data payload. In some embodiment, the same data payload sent to the same device may also be encrypted differently for each occasion. For example, for each query, the third-party server 140 may generate a different random symmetric key to encrypt the data payload. The symmetric key may be encrypted by the public key of the device making the query.

By way of example, the third-party server 140 may receive a query from a device via the query interface 205. The query may include a subscriber identifier of the device. The third-party server 140 may store confidential information that includes an association between the subscriber identifier and a public key of the device. The confidential information is generally not revealed to the public. The third-party server 140 may store the public key directly or may store the identity address of the device. For example, the identity address may be the device's DNS address that stores the device's public key. The third-party server 140 may determine, from the confidential information, an association between the subscriber identifier and the public key of the device. The third-party server 140 may retrieve the public key of the device. In response to the query, the third-party server 140 may generate a data payload. In turn, the third-party server 140 may encrypt the data payload by a symmetric key that is generated randomly. The third-party server 140 also encrypts the symmetric key by the public key of the device. The third-party server 140 transmits the encrypted data payload and the encrypted symmetric key to the device via the query interface 205. The device uses its private key to decrypt the symmetric key. The symmetric key is then used to decrypt the encrypted data payload.

The query interface 205 may serve to anonymize the identities of organizations 110 and devices. For example, the third-party server 140 may serve as a centralized server for the distribution of various messages on behalf of different organization customers. The query interface 205 may have the same address for various organizations 110 for various devices to send queries of different purposes to the same address. The query may be encrypted using the public key of the third-party server 140 so that the third-party server 140 may determine a proper response to the query based on the query content and the metadata of the query. For example, the query may specify the intended recipient of the query is an organization 110 but the intended recipient information is encrypted. In such a case, the organization 110 can be anonymized and the address of the query interface 205 will not reveal the identity of the organization 110 because the organization has delegated the message response task to the third-party server. In some embodiments, the third-party server 140 may provide a specific address of the query interface 205 for a particular organization 110. The address may be under the namespace of the Internet domain of the organization 110 and is delegated to the third-party server 140. While, in this case, the address may reveal the identity of the organization 110, the communication between the third-party server 140 and a device may be encrypted. For example, the messages from the third-party server 140 may be encrypted by different symmetric keys so that the nature of the communication is untraceable.

The query interface 205 may take various forms. For example, in some embodiments, the query interface 205 takes the form of an API such as REST (representational state transfer), SOAP (Simple Object Access Protocol), RPC (remote procedural call), or another suitable type. In some embodiments, the query interface 205 may be a namespace server such as a DNS server. In some embodiments, the query interface 205 may be a network routing node or a packet switching node. Other types of network interface may also be used as the query interface 205.

The third-party server 140, through the delegated authentication service engine 210, may provide the delegated authentication service on behalf of an organization 110. The delegated authentication service engine 210 may perform different authentication-related services, including providing authentication responses to message recipients for communications between two devices, contextual authentication, and certain authentication on behalf of some message recipients. On behalf of an organization 110, the third-party server 140 may receive an authentication query from a message recipient. The authentication query may include certain metadata of the message or an identifier of the transmitter, which claims to be associated with an organization 110. The identifier in the authentication query may be the same as an identifier stored in an identity record 146 or may include data metadata that allows the third-party server 140 to retrieve the identifier stored in the identity record. In response, the third-party server 140, as an operator of the delegated namespace zone 142, provides the identity record 146 or part of the identity record 146 to the message recipient as the authentication response.

An authentication query may be transmitted from a message recipient, which receives a message purportedly sent from a named entity associated with an organization 110. If the third-party server 140 operates as part of a DNS server, the authentication query may be a DNS query. If the third-party server 140 operates as other types of servers such as a blockchain server, the query may be in other suitable formats. For example, in an embodiment where a blockchain is used, the third-party server 140 may include an oracle machine to provide information to a smart contract saved in the blockchain for the generation of the authentication response. Other implementations are also possible.

On behalf of the organization 110, the delegated authentication service engine 210 may also provide services related to authentication using context information. The third-party server 140 may receive authentication context configurations from various organizations 110. Each organization 110 may have a different setting on the authentication context. The third-party server 140 may translate the authentication context configuration information to a formatted DNS record and publish the record as a resource record under the sub-domain. DNS allows the publication of multiple resource records under the same name. Each organization 110 may manage its own authentication context information and settings via an API or an application provided by the third-party server 140, such as through the service management interface 260. The third-party server 140 translates the authentication context information and settings into namespace records (e.g., DNS records) for publication.

Authentication context information may include credentials (e.g., one or more public keys or another suitable authentication credential of a named entity device 130) and contextual metadata (such as time, location, etc.) that may be needed for a message recipient to authenticate a message purportedly transmitted from the named entity device 130, and other information needed for the authentication. Authentication context information may also be an example of a type of identity records 146. The format of the authentication context information may depend on the type of messages being transmitted. For example, in the context of emails, the format may be in compliance with one or more established standards such as SPF (Sender Policy Framework), DKIM (DomainKeys Identified Mail), DANE (DNS-based Authentication of Named Entities). In other contexts, the format may be in compliance with other protocols that are in various layers such as the application layer, transport layer, or Internet layer. A message recipient may send an authentication query. Upon the right conditions under the rules specified by the named entity device 130, the third-party server 140 provides the message recipient with the authentication context information.

Complexity in communications may arise from the contexts constraining the communications. Besides verifying the credential, a message recipient may also verify other contexts. Examples of such contexts may include time, location, directionality (one way or two way), communication method (e.g. mobile phone not email), sequencing (in a chain of communications, whether the order matters), topology (one-to-one, one-to-many, many-to-one), modifiability (whether the communications can be modified), modifications (whether a modification is allowed), and form of ID (the primary authenticated key into the database, for DNS this is a domain, for other datastores such as IPFS and blockchain, the keys are different). Non-substantive constraining context or limitations to the communications may be managed by the third-party server 140. Further examples of contexts include amplification, aggregation, summarization, shelf life, and revocation. Another example is a computationally intensive context—one requiring specific software developed and installed to perform these computations.

Authentication context settings, which may be provided by an organization 110 and managed by the third-party server 140, may specify what type of information will be provided and how the third-party server 140 should respond when an authentication query is received. For example, in one setting, an organization 110 may specify that a named entity's public key will be forwarded when an authentication query is received. In another example, an organization 110 may specify additional context information (e.g., time, location) for the third-party server 140 to forward. In yet another example, an organization 110 may allow the third-party server 140 to perform certain authentication processes on behalf of a message recipient, such as in a circumstance where the message recipient is a device that may lack the general processing power to perform certain authentication. In yet another example, an organization 110 may require the third-party server 140 to perform authentication of the message recipient before its own name entity's authentication context information is forwarded.

In some embodiments and based on the setting of an organization 110, authentication may be mutual. The third-party server 140 may authenticate the message recipient before any authentication context information is forwarded to the message recipient for the recipient to authenticate the message that is purportedly transmitted under the domain of the named entity device 130. The third-party server 140 may verify the digital signature of the message recipient that may be included in an authentication query.

In some embodiments, the delegated authentication service engine 210 may perform part of the authentication process on behalf of a message recipient. Communications among certain types of IoT devices may be an example that may utilize this feature. Certain IoT devices may be sensors or other devices that have limited processing power. They may include a hardware circuit for decrypting and encrypting cryptographic keys and have limited processing powers designed for performing certain limited actions as a sensor. Those IoT devices may be message recipients that receive information from a beacon that broadcasts the message over radio waves in the vicinity. In some cases, a malicious party may record the broadcast of a message and playback the message at another location in an attempt to manipulate IoT devices that are not the intended recipients. An IoT device, upon receiving the message, may transmit an authentication query to the third-party server 140. An organization 110 may specify that the third-party server 140 can authenticate the message on behalf of certain devices. For example, the third-party server 140 may verify the location information metadata (an example of contextual evaluation) of the sending location of the message in order to confirm that the message was sent from a legitimate beacon. The third-party server 140 may transmit a response that includes the public key of a named entity device 130 (e.g., the message transmitter) and contextual evaluation result over the Internet that may include DNSSEC (Domain Name System Security Extensions) and TLS (Transport Layer Security) to ensure the response is securely delivered to the IoT device.

The configuration and policy engine 144 may determine rules for various participants in an application environment. A policy may be defined and initiated by an organization 110. An organization 110 may transmit the policy setting to, or build the policy at, the third-party server 140. The configuration and policy engine 144 translates the policy to one or more configurations, whether generated automatically based on the policy requirement or generated partially manually through a guided workflow.

The configuration and policy engine 144 may determine dynamically one or more context-specific policies that are applicable to a policy consuming device 136. The configuration and policy engine 144 may transmit the determined policies to the policy consuming device 136 as an interaction control list. Interaction control lists may be a set of rules that define what devices are authorized to interact with a policy consuming device 136 and define how the policy consuming device 136 may behave in certain situations. The distribution of the interaction control list may be through direct communication, such as a message payload to be sent to a policy consuming device 136, or via a namespace record. For example, the interaction control list, encrypted or not, may be posted on a DNS record for devices to download. To allow the third-party server 140 to communicate with a wide variety of devices, the interaction control list may be packaged in a well-known or standardized format.

A policy may include various elements that define the policy settings in an application environment. In one example, elements of a policy may include roles, members, and rules. A role defines a type of participant in the application environment. For example, a type of sensor may assume a certain role in an autonomous vehicle application environment. A role may include a collection of members and rules. The role provides a logical container for how similar members should interact. A member is a participant in an application environment. A member may be a named entity device 130 or a policy consuming device 136. Continuing with the example of a role being a type of sensors, members under the role may be individual sensors that are located in various locations of the application environment. A rule is a description of how members of a role are authorized to interact. For instance, members of a first role may accept certain communications from members of a second role, but not a third role. A rule may also define the format of information accepted by a destination member. A rule may offer granular control over certain field values, such as various values of parameters, metrics, and metadata. A rule may be a feature of a particular role, but may also be a feature of the broader application. The details of the policy may be translated into various configurations in order for the policy to be achieved.

An interaction control list may be a version of a policy and may include relevant data that is packaged in an appropriate format (e.g., a well-known or standardized format) for a policy consuming device 136 to consume. An interaction control list may be derived from a policy, whether the control list is filtered or not, converted or not, combined or not. For example, a policy consuming device 136 may receive a message from a named entity device 130. While the named entity device 130 may be authenticated, the policy consuming device 136 may need to determine whether it is authorized to communicate with the named entity device 130. In turn, the policy consuming device 136 may query the third-party server 140. The configuration and policy engine 144 may determine the role of the named entity device 130 and generate a customized interaction control list for the policy consuming device 136. The interaction control list may include a list of authorized named entities with which the policy consuming device 136 is authorized to communicate. The interaction control list may be filtered from the larger policy and may include data that is relevant to the particular policy consuming device 136.

The interaction control list may take different forms. For example, an interaction control list may be a communication policy or protocol that defines how an IoT device may communicate with other devices generally or in specific situations. An interaction control list may also take the form of a set of instructions that may define or alter the behavior of a device. The policy may also take the form of a policy plugin that may enable a device with the plugin to behave in a standard way or be compliant with a standard. In yet another example, an interaction control list may include key-value pairs that include a list of authorized named entity devices 130 and other parameter values that are saved using the parameter name as the key. An interaction control list may use well-known formats such as JSON, XML, but may also in a standardized format that is yet to be developed in the future by an industry that deploys various application environments.

The credential escrow management engine 220 may store confidential credentials (e.g., username and password) of named entity devices 130 and manages the credentials on behalf of the devices 130. In some cases, certain named entity devices 130 may not be complex enough to include the hardware and software (or simply it is too costly to include those secure elements) to safeguard certain confidential credentials, such as text-based credentials that may be used as the API credentials to communicate with an API of the organization 110. Instead of storing the credentials in each named entity device 130, an organization 110 may deposit the credentials of devices 130 that are registered with the organization 110 to the credential escrow management engine 220. The credential escrow management engine 220 may store an association among (1) the identifier of the named entity device 130 saved in the DNS record associated with the device 130, (2) the named entity device's API key identifier (e.g., API username, which may or may not be the same as the identifier in the DNS record), and (3) the device's API secret key (e.g., API password). In some embodiments, the association may also include the named entity device's public key. In one embodiment, to enable the named entity device 130 to communicate with the API, the credential escrow management engine 220 may provide an ephemeral credential (e.g., a session token) for a named entity device 130 to communicate with the API. This limits the exposure of a compromised named entity device 130.

By way of example, the credential escrow management engine 220 may provide a credential of a named entity device 130 to the organization's API to perform the initial authentication on behalf of the device. A named entity device 130 that intends to initiate a communication with the API may provide a request to the third-party server 140. The request may include an identifier of the named entity device 130, such as the identifier in the DNS record of the named entity device 130. In response, the credential escrow management engine 220 may provide the named entity device's API credential (in escrow of the third-party server 140) to the API. The API, upon authenticating the credential, may generate an ephemeral credential such as a session token for the named entity device 130 to establish a communication session with the API. The API may transmit the ephemeral credential to the third-party server 140. The credential escrow management engine 220 may transmit a query to a DNS (or another namespace system) that includes the DNS record of the named entity device 130. The DNS record may include the public key of the named entity device 130. The credential escrow management engine 220 may use the public key to encrypt the ephemeral credential. The credential escrow management engine 220 may publish a namespace record (e.g., DNS record) at the namespace associated with the organization 110. The namespace record contains the encrypted ephemeral credential for the named entity device 130 to retrieve the ephemeral credential at the namespace system. The namespace record may also include a time to live entry that corresponds to a lifetime of the session token. Upon retrieval, the named entity device 130 may use its private key to decrypt the encrypted ephemeral credential. While in this disclosure the credential for API is often described as a time-bound credential, in some embodiments the encrypted credential may also be non-time-bound. For example, the distribution of the credentials may include the distribution of text-based credentials from the third-party server 140 to a named entity device 130. Some APIs do not support the use of a time-bound session token and rely on key/secret (e.g., username/password). The credentials may be stored in the third-party server 140 and may be sent to the named entity device 130 on demand.

The identity self-management authenticator 240 may perform authentication for the self-rotation of certificates. The identity of a named entity device 130 may be asserted by using the private key to decrypt a message encrypted with the device's public key, which may be included in a DNS record. For the DNS record of a named entity device 130, the public key or certificate may be removed after a predetermined period to allow an ephemeral PKI-based identity. The identity self-management authenticator 240 may authenticate the ephemeral identity. For instance, if a device has a core identity with the name 123.edge._device.example.com, with a public key at that record, the third-party server 140 may use that identity to establish ownership of (a) names under that place in DNS, which follows the natural hierarchical organization of the namespace, or (b) a delegated identity which may indicate the core identity by a specifically-formatted record in the namespace. For DNS, this may take the form of a TXT record which indicates the parent identity.

The prior example may allow a device at name 123.edge._device.example.com to establish a short-lived public key credential at _serviceclient.123.edge._device. example.com by virtue of the application being configured to allow devices to establish short-lived sub-identities in this fashion. The process of establishing this name-pubkey identity is described in the next example. The difference between this use case and the next may be the method for indicating the authorized parent credential. With this method, it is naturally indicated by the hierarchy of the namespace. In the next, it is deliberately indicated within the namespace or in the application configuration.

The latter example may exist as two DNS records at the name 123.summarizer._device.anotherexample.com. One record is a TXT record which indicates 123.edge._device-.example.com as the parent or core identity. The second record at 123.summarizer._device.anotherexample.com may be a TLSA record that contains a public key. The TLSA record at 123.summarizer._device.anotherexample.com is expected to be frequently updated, and if it exceeds its expected lifetime without an update, the record may be removed or 'tombstoned' (having unusable data placed in the record to indicate the identity's existence, but that it should not be trusted). Alternatively, it may make sense for the organization owning anotherexample.com to conceal from publication the parent identity of the device, for privacy reasons (maybe this is a medical device and example.com domain is known for producing a specific type of medical device). In the case where this privacy feature is desired, the third-party server 140 will provide a feature in the management application where the application may correlate the 123.summarizer._device.anotherexample.com device with 123.edge.example.com, for the purpose of authenticating the rotation of the public key.

The process of establishing an ephemeral public key credential at 123.summarizer._device.anotherexample.com may involve the device in possession of the identity as well as the 123.edge._device.example.com to (1) create or obtain a new key pair, (2) create a certificate signing request (CSR) associating the new public key and the 123.summarizer._a-notherexample.com name, (3) use the private key associated with the 123.edge._device.example.com identity to generate a cryptographic signature of the CSR and a nonce, (4) transmit the signature, nonce, and CSR to the third-party server 140.

The third-party server 140 may (1) inspect the CSR and retrieve the name of the proposed identity, (2) determine (either by the TXT record or internal application configuration) that the parent identity for 123.summarizer._device. anotherexample.com is 123.edge._device.example.com. (3) retrieve the public key associated with the 123.edge._device.example.com identity and use that public key to authenticate the CSR, nonce, and signature, (4) publish the new public key from the CSR, or a certificate containing the same, at the requested name (123.summarizer.anotherexample.com) for a limited time.

The secure software channel management engine 250 may manage the policy for secure software distribution. The secure software channel management engine 250 may correlate subscriber identifiers to universal identities and software channels. The secure software channel management engine 250 may maintain an internal reference of a named entity device's data, such as the device's subscriber identifier, public key, application type, device type, and other information that is associated with the device. The secure software channel management engine 250 may deliver software to various named entity devices 130 in a secure manner. A device may send a query to the third-party server 140 via the query interface 205. In response, the secure software channel management engine 250 may generate the appropriate data payload as a response to the query. The response may be encrypted as discussed above with reference to the query interface 205.

The secure software channel management engine 250 may maintain a database that correlates subscriber identities with channels of software updates. The secure software channel management engine 250 may be analogous to a subscription service where the channel periodically updates the most recent edition of a firmware bundle or configuration file. When the client device indicates its identity to the firmware management service (such as over HTTPS (Hypertext Transfer Protocol Secure) or MQTT (Message Queuing Telemetry Transport)) the secure software channel management engine 250 may correlate the device's identity with the appropriate software channel and indicate to the client device the unique identifier of the current version of the software. The unique identifier may be a version tag (e.g., v1.0.1) or a computed hash, or some other way of uniquely indicating the current version of the subscription asset. This response may also contain the certificate or public key of the system that built and signed the versioned asset. When the device receives the version indicator (which may be encrypted using the client identity's public key) the device compares the current version of the asset as described by the third-party server 140 with the current version in use on the device. If there is a version mismatch, the device then requests the most recent version of the asset. The third-party server 140 responds to this request by retrieving the signed asset from an artifact repository or a source repository as data payload. The third-party server 140 may encrypt the asset with the public key associated with the requesting device's identity. This may be direct encryption using a public key, or it may be a key-wrapping approach where a symmetric key is used to encrypt the payload, and the symmetric key is encrypted by the public key. The symmetric key should be randomly-generated for every download to prevent the analysis of multiple asset update actions using the same symmetric key and to prevent the correlation of device capabilities by correlating the metadata associated with the device update process (like the hash of the encrypted payload). When the device receives the update, the device uses its own private key to unpack the update object. The device may use a certificate and signature embedded in the update object or, if provided, the same provided via the initial update request interaction to verify the software download. Alternatively, the certificate of public key may be referenced in the update using the signer's DNS name, whereby the device may retrieve the public key used for signature verification from DNS.

The third-party server 140 may be associated with a source configuration management engine and an artifact management engine. Those engines may be version control engines that manage the source code, libraries, library objects, artifacts, and other binary file objects. A source configuration management engine may manage various source code repositories. Example source configuration management engine may manage repositories that are hosted on GITHUB, BITBUCKET, GITLAB, SOURCEFORGE, etc. An artifact management engine may manage the libraries, library objects, artifacts, and other binary file objects. The artifact management engine may automatically fetch updates to various libraries and clean up libraries. The artifact management engine may also tag various libraries and objects with searchable metadata and indexes. An example of an artifact management engine may include services provided by companies such as ARTIFACTORY.

The service management interface 260 may be an interface for an organization administrator to change settings with respect to various engines such as to change message distribution policies associated with the query interface 205, change the authentication policy in the engine 210, to upload credential to the credential escrow management engine 220, define various policies for distribution by the configuration and policy engine 144, etc. The service management interface 260 may include a portal for professional developers, an API, and a user-friendly portal for layman use. For example, the service management interface 260 may provide a user-friendly portal for various organizations to adjust various settings.

The service management interface 260 may take different forms. In one embodiment, the service management interface 260 may control or be in communication with an application that is installed in an administrative device 114. For example, the application may be a cloud-based SaaS or a software application that can be downloaded in an application store (e.g., APPLE APP STORE, ANDROID STORE). The service management interface 260 may be a front-end software application that can be installed, run, and/or displayed at an administrative device 114. The service management interface 260 also may take the form of a webpage interface of the third-party server 140 to allow organization administrators to access data and results through web browsers. In another embodiment, the service management interface 260 may not include graphical elements but may provide other ways to communicate with organization administrators, such as through APIs.

The entropy provider 270 may be a specialized piece of hardware, software, or a combination that produces high-quality randomized bits for various devices, such as certain IoT devices or other named entity devices that may not be equipped with the component to generate high-quality entropy. Randomized bits may be used to create high-quality cryptographic keys. However, truly randomized bits may be difficult to generate using only computational algorithms. The entropy provider 270 may refer to certain real-world randomized events such as physical phenomenon that are expected to be random. The entropy provider 270 may provide entropy to a named entity device 130 for the device 130 to generate cryptographic keys. In some cases, a named entity device may be a provisioning device. The entropy provider 270 may transmit high-quality entropy to the provisioning device. In turn, the provisioning device uses the entropy to generate cryptographic keys and provision a new device with the keys. The entropy provider 270 may also be used to generate random symmetric keys that are used to encrypt messages and other data payloads transmitted from the query interface 205, whether the data payloads are device updates generated by secure software channel management engine 250 or other types of message payloads.

The enrichment engine 150 modifies configurations and policies automatically or through a guided workflow process. In modifying a configuration or a policy, the enrichment engine 150 may receive various external reports 155. The external reports may be referred to as interaction reports. Example external reports 155 include authentication or encryption reports from a receiving organization 152 (such as DMARC or TLS-RPT (transport layer security reporting) reports). The receiving organization 152 may deliver its reports via a message delivery system like email or HTTP POST, or provide an API whereby authentication or other status information may be consumed. The authentication report may contain information that may indicate the sender and recipient of the messages (including the specific named entity or organization), as well as the entities involved in handling the email on behalf of, and between, both parties. This encompasses not only protocol-level forwarding entities (MTAs (mail transfer agents) or secure email gateways in email) but syndication services, like email list servers. Not all entities involved in the handling of the messages may be authenticated, and they are represented at the greatest level of detail and certainty which available protocols provide. Sometimes this is only as specific as an IP address or a hostname from a DNS PTR record.

The enrichment engine 150 may consume information from external information providers 153 such as OSINT (Open-Source Intelligence), GeoIP, or via a paid/private API such as D&B (Dun & Bradstreet), SFDC (SALESFORCE.COM), or other external data sources or services to contextualize the entities described in the authentication report. An example of this contextualization is the correlation of a domain name against a D&B report, which would indicate a parent company of the sending service. This is useful because as mergers and acquisitions happen, the business name under which a sending service operates may change, while the name in the namespace used to actually send messages may not. The enrichment engine 150 may also query a variety of other external information systems 153

(e.g. DNS, WHOIS, etc) to add context to the authentication, authorization, encryption, or other events. The enrichment engine 150 may attach a taxonomy describing the industry or other classification of business that the sending organization typically services, and use this to make recommendations to the organization on changes to its authorization policy. In an email setting, a policy consumer device 136 is a mail server of the receiving domain.

The enrichment engine 150 may provide classifications or ratings against authentication, authorization, or other events, such as rating certain events 'suspicious' when certain patterns are matched, and the process by which the enrichment engine makes the determination of suspicion may be based on the third-party server 140 customer's current configuration or global configuration.

The third-party server 140 may provide feedback to the technical administrator controlling an administrative device 114 via a variety of means. These may be emails, SMS messages, or alerts in the user interface or API of the third-party server 140 which may be delivered via an administrative device 114. The third-party server 140 may also provide an API or other connections for making information available to other systems such as security information and event management (SIEM) systems for the purpose of providing context for correlation against other security-related events, or for the purpose of providing alerts to interested parties, such as the staff of a security operations center. Alerts may be used to indicate that a new sending organization has been detected, and might correlate to the presence of a new policy change recommendation. In the email use case, the policy consuming device 136 may be an administrator device 114 responsible for managing the organization's email authentication settings.

The enrichment engine 150 may provide authorization based on real-world identity, which is distinguished from authentication results of the message itself. From the authentication metadata in the report and message headers from the actual messages, the enrichment engine 150 searches for the domain owner for locating the name of the business which owns the domain name that the message claims to originate from.

The enrichment engine 150 enriches the results from the report (e.g. IP addresses, domain names, business names) with information from external information providers 153 including various OSINT sources such as the domain's websites, information from business directories, information from trade groups to which the entity belongs. Business name enrichment has a tremendous number of datasets that may involve the characteristics of the technical components in the chain of message delivery, as well as searching the Internet.

The enrichment engine 150 conducts workflow management 225, which includes a process of repeated refinements that are performed until a level of certainty is achieved in the identification of the business from which the message originated. In some embodiments, the repeated refinement may be a recursion or iteration process. If the process of repeated refinements reaches a point at which no more information can be computationally processed to arrive at a positive sender identity, the repeated refinements end, and a human workflow is triggered, providing the metadata that's been gathered so far, for a human analyst to complete the investigative process. A human analyst either determines that the email sender should not have been authorized (this is an opportunity for policy improvement), or, from the metadata available to the rules engine, defines a correlation rule 221 that the algorithm may use in the future to automatically make a determination as to the identity of the sender. The output of this correlation rule (performed manually or automated) may be a recommendation for the sending domain's policy or the recipient's mailbox filtering.

The enrichment engine 150 generates and stores one or more correlation rules 221. The correlation rules include rules that categorize, label, or authorize inbound messages according to known vendors, by geography, and by business unit or internal organization. Certain vendors may have relationships only with certain sub-organizations, and should not be trusted or authorized for communications with the entire organization.

Correlation rules 221 include user-generated policies as well as engine-computed ones. For instance, a simple correlation rule might indicate that a public key found at a specific location in the DNS is only used for signing messages from a very specific sender or domain. The appropriateness of the sender may be determined by comparing the sender against a list of organizations that are known to already have a relationship with the recipient organization, the sub-organization to which the recipient belongs, or the actually intended recipient of the message. The enrichment engine 150 may make this determination based on a variety of factors, one example being whether the sender and recipient have a history of prior communication.

The information generated by the enrichment engine 150 may include known vendors, geographic correlation, business to domain correlation, and permitted middleware components, and other additional metadata. In an email setting, the information may also include allowed specific DKIM keys for specific vendors (more specific than DMARC spec) and provide SPF alignment between a message originator and a sending service. In IoT applications, similar patterns exist where specific middleware components, such as message brokering and queueing services, may be permitted to deliver messages on behalf of an organization 110.

When determining the appropriateness of communication, an understanding of all parties involved may be important. With email, it is common for a message to be encapsulated and/or forwarded by another entity. Sometimes this forwarding entity is an MLM (mailing list manager). For example, while the MLM's message may be authentic, there may be no prior history of communication between the MLM and receiver, and there may not be a valid mechanism available for authenticating the original message. In this example there might not be any apparent reason that the message would be appropriate. However, the original message may be relevant and useful to the recipient because of the original sender who sent the message to the MLM. Protocols such as OAR (original authentication results) or ARC (authenticated received chain) may cause the population of message metadata fields which identify the party that sent the original message to the MLM. The original sender, as revealed by the ARC headers, may have a history of communication with the recipient, and the system can mark the communication as appropriate though the apparent sender (the MLM) may be otherwise unknown to the receiving organization.

Example Automated Policy and Configuration Building Workflow

Figure 3:
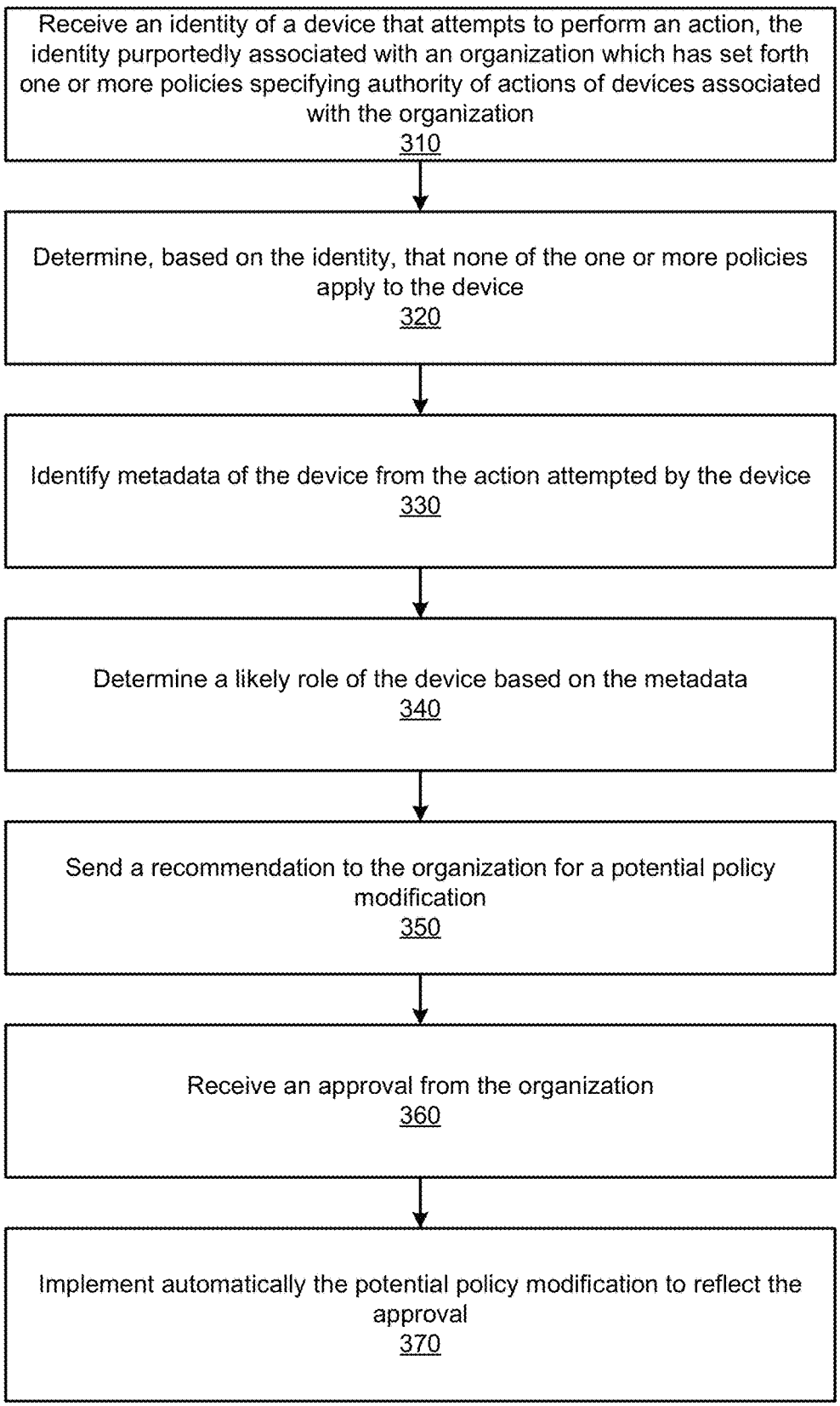
FIG. 3 is a flowchart depicting an example process for using a server to perform an automated policy and configuration generation workflow, in accordance with some embodiments.

FIG. 3 is a flowchart depicting an example process 300 that illustrates a software algorithm for using a server to perform an automated policy and configuration generation workflow, in accordance with some embodiments. The software algorithm may be stored as computer instructions that are executable by one or more general processors (e.g., CPUs, GPUs). The instructions, when executed by the processors, cause the processors to perform various steps described in the process 300. In various embodiments, one or more steps in the process 300 may be skipped or be changed. The process 300 may be performed by the third-party server 140 or a server of an organization 110. While the process 300 and other processes discussed in this disclosure may be described as being performed by the third-party server 140, these processes may also be performed by other suitable computers. For example, an organization 110 may not delegate the policy management to the third-party server 140. Instead, the organization 110 may have a computing server that directly performs the process 300.

The third-party server 140 may receive 310 an identity of a device that attempts to perform an action. The identity may be purportedly associated with an organization 110 which has set forth one or more policies specifying the authority of actions of authenticated devices associated with the organization 110. The device may be any device in the system environment 100, such as a named entity device 130, a policy consuming device 136, a user device 160, a transmitter device 170, and a recipient device 180. The organization 110 may have delegated the third-party server 140 to manage its policies, such as interaction control policies.

An identity may be a namespace identity, a public key, a credential, or any suitable data that identifies the device. In some embodiments, the identity may be stored in a namespace such as the DNS. The identity may include multiple components, such as a unique identifier and a credential that can be used to authenticate the device. For example, in one case, the identity may be a namespace address (e.g., DNS address) at which the public key of the device is stored. The third-party server 140, when received information related to an action performed by the device, may use the DNS address to retrieve the public key of the device and authenticate the device by verifying one or more digital signatures that are transmitted along with the action performed by the device. For example, the device may send a message that includes its digital signature. An identity may be universal or local. The device may have a single universal identity that can be used in any system or may participate in different applications, each of which is associated with a specific identity that is limited to the particular application.

An identity name may be sent dynamically (e.g., on the fly as the device performs an action) or included in a report (e.g., an external report 155 and an interaction report) that summarizes actions performed by various devices in a system. In some embodiments, the third-party server 140 may serve as a system's policy administrator, which dynamically determines the authorization of various devices in the system. For example, a first device may gain access to information stored in a second device. As the second device receives the identity of the first device, the second device may provide the third-party server 140 with the identity and have the third-party server 140 to determine the authorization of the first device. In some embodiments, the third-party server 140 may receive a collection of identities in a summary report. For example, in an email system, an organization 110 may delegate the third-party server 140 to manage authorization and policy management of emails that are purportedly sent from the organization 110. The third-party server 140 may receive Domain-based Message Authentication, Reporting, and Conformance (DMARC) reports from various email recipient servers. The DMARC reports include a collection of identities of email servers that sent emails purportedly on behalf of the organization 110 using the domain of the organization 110.

An external report 155 may be transmitted to the third-party server 140 in various ways. For example, in one case, the first device (e.g., the message originator) may specify where to send the external report 155 or how the external report 155 is hosted. In another case, the second device (e.g., the message recipient) may determine on its own where to transmit the external report 155. In yet another case, certain recipient devices may have agreements with other parties to send the external report 155 to the third-party server 140.

An action may be any suitable action that may be performed under the environment 100. An action may be sending a message, attempting to gain access, requesting information, querying for specific information, broadcasting data, transmitting data, interacting with other devices, or any suitable act that may be performed by a device. By way of example, a first device may transmit a message to a second device. The message may include the identity of the first device, information for authenticating the device such as its digital signature, and/or other useful context and metadata. The first device may claim to be associated with an organization 110. Upon the receipt of the message, the second device may seek policy information from the third-party server 140 to determine how to properly respond or react to the incoming message given the identity it purports and the relevant context. In another example, an IoT sensor may transmit a set of data to a server. The server may try to determine whether the IoT sensor is legitimate in order to decide whether to trust the data transmitted from the sensor. When two devices attempt to interact with each other, one or more devices may rely on the third-party server 140 to determine how the devices should act based on one or more established policies for the organization that receives the message.

The third-party server 140 may be a delegated server that manages the policy and automatically generates new policies on behalf of an organization 110. The organization 110 may be an operator of an application environment that includes a variety of devices interacting with each other. The organization 110 may set forth certain initial interaction control policies that define how devices should interact with each other. The configurations to achieve the interaction control policies may include authentication protocol, authorization list, specific actions to be taken in a given situation for a particular role of devices, contexts for communications as discussed in U.S. Provisional Application No. 63/057,814, etc. As more devices participate in the application environment, the existing policies may not foresee all possibilities or cover the identities of some devices. The third-party server 140 may automatically generate policy recommendations and provide policy building workflow for administrators of the organization to make decisions on new policy generation using the process 300.

The process 300 may be applied in different settings. For example, an application environment may be an email environment in which an organization 110 retains various entities to send emails on behalf of the organization 110. The organization 110, in this example, may be referred to as the message originators and relevant emails may bear the domain name of the organization. For example, a retailer (retailer.com) may hire a marketer (marketer.com) to send promotional emails on behalf of the retailer. The promotional emails may bear the domain of the retailer but are in fact created by the marketer. The retailer may hire other companies to send different topics of emails on behalf of the retailer. In some cases, a malicious party may pretend to be associated with the organization 110 and send an email under the domain of the organization 110. To prevent this from happening, the organization may set forth one or more sender policy framework (SPF) policies and domain keys identified mail (DKIM) policies to specify how emails associated with the domain should be authenticated. An email recipient server may receive various emails that bear the domain of the organization 110 but are in fact sent from different email servers. The email recipient server may generate a DMARC report that records the identities of devices that purportedly sent emails on behalf of the organization 110. The third-party server 140, delegated to manage the email policies, may receive the DMARC report and determine whether a device is authorized to send emails on behalf of the organization 110.

In an application environment of an IoT device setting, such as an autonomous traffic system, the third-party server 140 may automatically generate policies that govern the actions of the devices using the process 300. For example, in some embodiments, an IoT device may rely on a message broker to send or receive messages on behalf of the IoT device. This can be similar to an email situation where an organization 110 relies on an email server to send emails. Also, the reliability of various data detected by IoT devices may also depend on the policy determination set forth by the third-party server 140.

Continuing to refer to the process 300 in FIG. 3, the third-party server 140 may determine 320, based on the identity, that none of the one or more policies apply to the device. In an application environment, even though the organization 110 has set forth certain policies, the policies may not cover all activities, whether the activities are eventually determined to be legitimate or not. By way of example of an email system, a message originator may indirectly delegate the distribution of its messages that bear its domain to various email sending servers, some of which may not have a direct relationship with the message originator. Continuing with the example of a retailer retaining a marketer to send promotional emails on its behalf, the emails created by the marketer may not always fall under the authorization policies set forth by the retailer. In one case, unbeknownst to the retailer, the marketer may ask a legitimate email server (e.g., Mailchimp) to send the emails that are created by the marketer. As a result, the emails bearing the domain of the organization 110 may appear to be sent from the email server. The organization 110 may not initially have a policy that establishes the email server (i.e. Mailchimp) as valid. The enrichment engine 140 would inform the customer admin 115 that the sending service should be enabled.

In an application environment of an IoT device setting, in some cases, new devices that are not previously registered in the application environment may participate in the environment. For example, in an autonomous vehicle system, new vehicles may enter a local traffic system. In a sensor grid system, a new set of sensors may also begin to provide data to a server. Also, in various situations, owing to a large degree of flexibility and potential of an IoT device system, pre-existing policies may not address every scenario and new situations may come up in the system. In a communication between two devices, the recipient device may receive an incoming message but is uncertain how to react or respond to the message.

In some cases, for existing devices whose identities are recognized by the third-party server 140, new actions or new sets of combinations may arise. The actions will need to be addressed by new policies that are not yet established by the organization 110 or the third-party server 140. For example, one device (e.g., a sensor) may be authorized to perform a certain action (e.g., providing sensor data) while may not have been authorized to perform other actions (e.g., accessing data). In an example of an email setting, an email server may be authorized to send emails on behalf of a first organization but not a second organization, even though the same identity is used for the email server.

An application environment could include different types of configurations that may address the authentication or authorization of the actions of a device. In some embodiments, a configuration may address the authentication requirement of a certain action associated with a device. In one case, the configuration may require an authentication of the device before any communication is further evaluated for authority. In another case, the configuration may allow the devices in the application environment to bypass authentication. The configuration may also set forth the protocol to obtain authentication. For example, the configuration may use the delegated namespace zone 142 and the delegated authentication server engine 210 to perform the authentication.

In cases where the configuration set forth an authentication requirement, the third-party server 140 may to perform authentication first to confirm the identity of the device before proceeding with determining the potential role of the device. The action of the device may still be rejected after the authentication if the third-party server 140 determines that the role of the device may not have sufficient authorization to perform such an action. In some embodiments, authentication may be bypassed. For example, in an email setting, a sending server may fail the SPF policy but the third-party server 140 may still proceed to determine whether to recommend accepting emails sent from the sending server.

A policy may be a set of rules that are related to the authorization of a device to perform certain actions after the device is authenticated. This type of policy may be managed by the configuration and policy engine 144 and determines the authorization of an action of a device based on the device's role. A device may be authorized under a first policy to perform a first action but the third-party server 140 may not find a second policy that addresses a second action attempted by the device. Prior to determining whether a policy is applicable, the third-party server 140 may authenticate the device so that the role of the device may be determined. In some cases, if third-party server 140 may also determine that none of the policies apply to the device because the third-party server 140 is not able to determine a role for the identity given by the device.

The determination step 320 may be based on in-band data. In-band data are data that are directly obtainable from the action performed by the device or data that are transmitted within the application environment. For example, in-band data may include the identity of the device, the digital signature and certificate of the device, the contextual information of the action (e.g., time, location, nature of message), and headers of messages associated with the action. These data may be included in the message associated with the action performed by the device. For example, in one case, the action is the transmission of the message itself. The message may include the device's digital signature, certificate, and identity. The contextual information may be determined based on information gleaned during the receipt of the message and any data included in the message itself, such as data in the header of the message. In another case, the action is a request for access. The in-band data may be included in the request.

The third-party server 140 may identify 330 metadata of the device from the action attempted by the device. The metadata may be part of the in-band information or out-of-band information known to the enrichment engine 150 such as data from external reports 155, external data sources 153, or human analysts 154. The metadata may be of different natures and obtained from different sources that are associated with the action performed by the device. In some embodiments, example metadata may include the device credential, certificate of the device, operator of the device, message headers, policy and authorization request data, device capability and contextual information associated with the action. The metadata may be included in a DMARC report, obtained directly from the message, retrieved from a DNS TXT record associated with the device, or measured based on the context of the action such as time, location, and device specification or customer configuration. Out-of-band data may also be information included in the location specified by the device. For example, in some cases, the device does not directly transmit its credential information to a recipient. Instead, the device points to its DNS address that includes a TXT record including additional information such as the identity record and public key of the device. In the setting of an email system, information included in the DMARC report is considered as out-of-band information.

The identification 330 of metadata of the device may also include a selection of metadata that is deemed more important than other metadata for the determination of nature and the role of the device and recommendation of a new or modified policy that can be applied to the device. In some cases, the selection may be determined based on one or more objective criteria, filtering criteria, metrics, statistical models or other suitable ways. For example, the third-party server 140 may collect metadata of similar devices or devices of the same source or operator (e.g., same email server in a DMARC report) and conduct statistics to identify a few most common metadata that are present in those devices. The third-party server 140 may prioritize the selected metadata for use in subsequent steps in determining recommendations of policies.

By way of example, metadata such as device credentials, certificates, and operators may be useful for determining the role and the nature of a device. The third-party server 140 may prioritize metadata of devices that share the same operator because the determination of the nature of the operator may provide useful information on the role of the devices. The device credential and certificate may be helpful to determine whether the device is likely to be legitimate and be operated by a reputable source. Those data may be included in a DMARC report in the case of emails. The third-party server 140 may select the most common fields in the DMARC report as the metadata that may be prioritized for determination.

The metadata may also be related to the contextual information and the device capability. The third-party server 140 may use the contextual information and the device capability to determine whether the action taken by the device matches the device capability. By way of example, a device may be a temperature sensor that is configured to transmit temperature data. If the device attempts to transmit pressure data, the third-party server 140 may determine that the action is unauthorized. The contextual information is also helpful for the third-party server 140 to determine the role of the device and the nature of the action. In a sensor grid system, the location of the sensors may be fixed. A significant change in location of a sensor as reflected in the contextual metadata may make an originally authorized sensor falling outside a predefined policy and may indicate suspicious activities associated with the sensor.

The third-party server 140 may determine 340 a likely role of the device based on the metadata. The third-party server 140 may use in-band metadata to determine out-of-band information that may be helpful for pinpointing the precise role of the device. Out-of-band information may include information that is not included in the performance of the action and may include information that is obtained from a different system. For example, based on the in-band metadata, the third-party server 140 may conduct a search of databases, such as open-source databases and Internet searches, to determine out-of-band information associated with the device. The out-of-band information may include the likely role of the device or may lead to a prediction of a likely role of the device.

The out-of-band information may include known business relationships and known nature of certain operators. For example, the third-party server 140 may determine, based on the in-band metadata, the business relationship between the operator of the device and another company. The relationship may be known to be legitimate and the likely role of the device may involve facilitating the relationship. In the case of an email system, a marketer and an email server may be known to operate together for the distribution of promotional emails for their customers. This relationship may not be directly included in the DMARC report but may be determined by searching one or more open source databases. The nature of the operator may also be used to determine the potential role of the device. If the operator is a well-known company or a company registered with a certified source, the third-party server 140 may determine that the action performed by the device is legitimate.

The search for out-of-band information may be conducted using one or more outside databases such as open-source databases. Some of those databases provide information with respect to the nature of certain domains, such as email domains and the operator of the domains. Entities that participate in an application environment or an industry may also agree to register their information to a public data source so that the third-party server 140 may rely on the data source to determine the nature of an entity that first appears in the application environment managed by the third-party server 140. By way of example, autonomous vehicle manufacturers and sensor manufacturers may agree to upload information to one or more common public data sources. An area may include multiple independently operated traffic systems that are divided geographically. The third-party server 140 of a particular traffic system may rely on the public data sources to determine the out-of-band information of a vehicle entering the traffic system.

The identification 330 of metadata and the determination 340 of the likely role of the device based on the metadata may be a repeated refinement process. More details of some of the example determination processes are discussed in later figures including FIG. 4. In one embodiment, the third-party server 140 may conduct statistical analysis to identify one or more metadata that are deemed more important. The third-party server 140 uses the metadata to determine out-of-band information that is relevant to the device. The out-of-band information may be used to enrich the metadata associated with the device. For example, one or more fields of the metadata of the device may be missing first when only in-band information is available. The third-party server 140 may use out-of-band information to determine some of the missing metadata. The third-party server 140 may repeat the refinement process and start a new round of selection of metadata. The selected metadata is then used to search for more out-of-band information until the third-party server 140 is able to determine the likely role of the device.

The role of the device is an authorization category that determines the authorization of the device in an application environment to perform an action. In some embodiments, the identity of the organization represented by the device may also be determined. For example, in an email setting, the third-party server 140 may determine the organization that sends the email. The identity of the organization may be used as a representation of the role of the device. A device may be associated with different roles based on the context and the nature of the actions. Each role may have a different degree of privilege in interacting with other devices in an environment. One or more policies may describe the authorization of the role. If the third-party server 140 determines that a new device belongs to a role that is associated with an existing policy, the third-party server 140 may recommend adding the identity of the device to an authorized device identity list. If the third-party server 140 determines that a device belongs to a new role that is not previously undefined, the third-party server 140 may recommend generating a new policy to address the new role.

The third-party server 140 may send 350 a recommendation to the organization 110 for a potential policy or configuration modification. The recommendation may be an automated recommendation. The third-party server 140 may provide the recommendations as a form of a guided workflow that may be displayed at a graphical user interface (GUI) for an administrator of organization 110 to make selections. The guided workflow may include questions, selections, and suggestions to guide the administrator to generate a new policy. The detailed process of the guided workflow may depend on the implementation. For example, in some embodiments, the guided workflow may start with a recommendation to accept the device as an authorized entity. The third-party server 140 may present evidence, such as out-of-band information, that shows the nature of the device. The guided workflow may also include selections for the administrator. For example, in some situations, the third-party server 140 may determine that the device could have more than one potential role. The guided workflow may provide the administrator option to manually select the role. In some embodiments, the guided workflow may also serve as part of the real-time feedback to enrich the metadata of the device in order to determine the likely role of the device. For example, the guided workflow may serve as a platform for an administrator to manually enter out-of-band information that assists the third-party server 140 to reach a conclusion of the likely role of the device. An example process for generating a guided workflow is further illustrated in FIG. 5.

Upon completion of the guided workflow, the third-party server 140 may provide a recommendation of policy adoption for the administrator of the organization 110 to decide whether to accept the policy modification. The recommendation may be specific to a particular combination or particular situation. For example, in an email setting, a policy recommendation with respect to authorizing a message delivering server 176 to send emails on behalf of an organization 110 may be specific to the combination of the email server and the organization 110, such as configuring SPF and DKIM for organization 176 in the organization's namespace server 112. In some cases, the authorization does not extend to the email server sending emails on behalf of another organization. The first organization 110 may be associated with a first domain and the email server 110 may be associated with a second domain. The recommendation may be specific to the pairing of the first domain and the second domain. The email server may remain unauthorized for sending emails on behalf of other domains. In an example specific to an IoT device environment, the third-party server 140 may recommend the authorization of a first type of actions to be performed by the device but not a second type of actions.

In some cases, the third-party server 140 may determine that the device is likely illegitimate. The third-party server 140 may recommend the organization 110 to reject the device or set a policy to subject all messages from the device to strict scrutiny.

The third-party server 140 may receive 360 approval from the organization 110. An administrator of the organization 110 may provide approval through the GUI that provides the guided workflow. The administrator may also reject the recommended policy. For example, the administrator may determine that the device should not be performing the action. Upon rejecting the recommended policy, the third-party server 140 may list the device as unauthorized or unauthenticated and reject the action attempted by the device. In some cases, the third-party server 140 may also adopt a policy that rejects the device and other devices of similar nature. The third-party server 140 may automatically update the configurations that are used to achieve the modified or new policies.

The third-party server 140 may implement 370 automatically the potential policy modification to reflect the approval. For example, the configuration and policy engine 144 may store a new policy based on the format used by third-party server 140. The newly implemented policy may be automatically implemented by the configuration and policy engine 144. In some embodiments, the policy may also be published at a specific location. In the use of DNS to store policies, the third-party server 140 may publish the policy in the DNS record of the organization to reflect the change in the policy of the organization 110. For example, for DMARC policies, the associated SPF and DKIM policies may be published by the third-party server 140 to the delegated namespace zone 142 of the organization 110 namespace server 112.

Example Automated Role Determination Refinement

Figure 4:
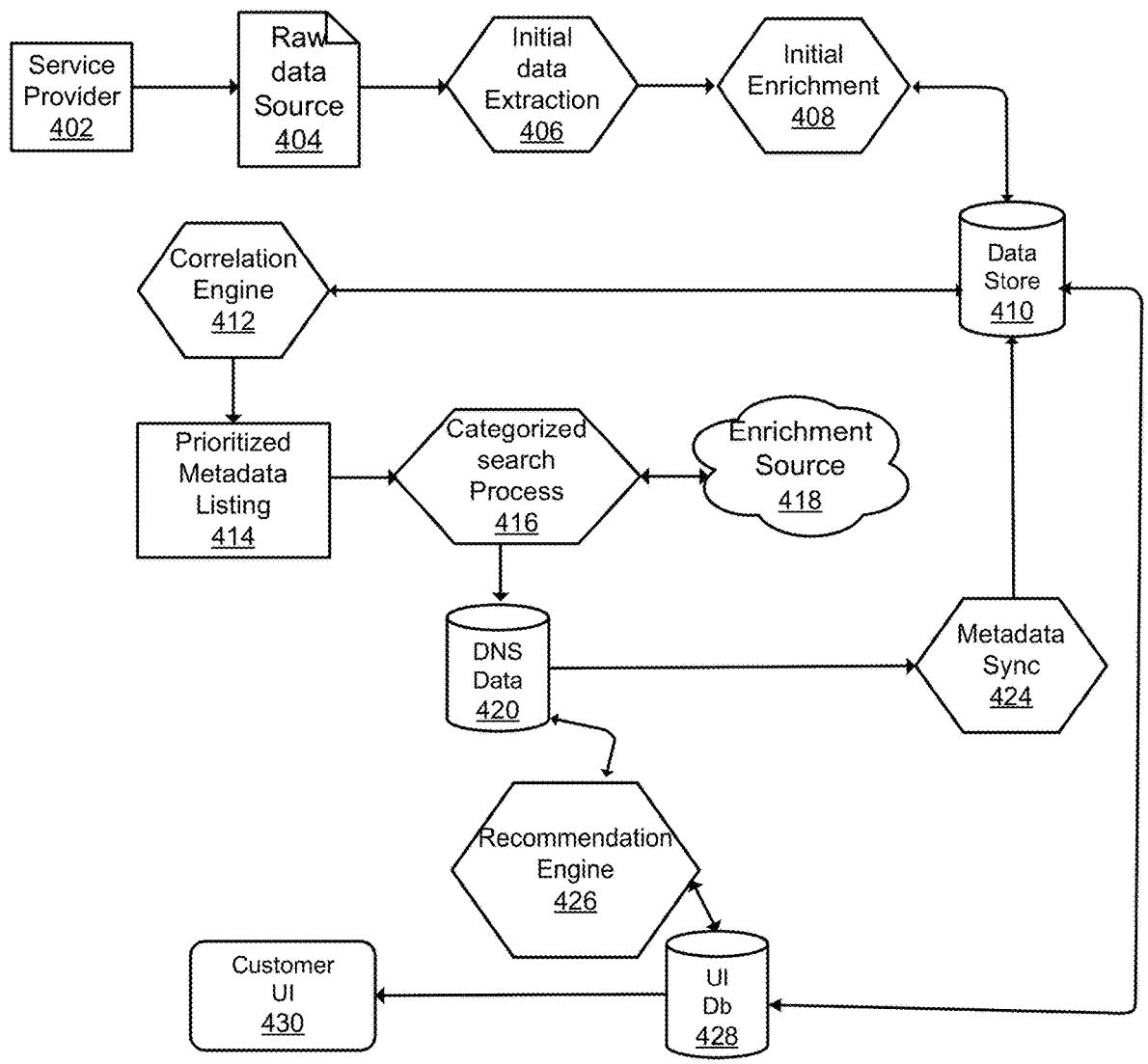
FIG. 4 is a block diagram illustrating various stages of a system for automatically determining the role of a device based on a repeated refinement process, in accordance with some embodiments.

FIG. 4 is a block diagram illustrating various stages of a system for automatically determining the role of a device based on a repeated refinement process, in accordance with some embodiments. The repeated refinement process may be a recursive or iterative process. The system in FIG. 4 is discussed with the use case of an email policy and recommendation process that starts with a DMARC report. However, the system in FIG. 4 is not limited to the use in emails and may be expanded to other uses.

A service provider 402 may provide a raw data source 404 to a third-party server 140. In the example of an email setting, the service provider may be an email receiving organization 152 that sends a DMARC report associated with a domain to the third-party server 140. The third-party server 140 may be delegated by the organization 110 that owns the domain to receive a raw DMARC report on behalf of the organization 110. The raw DMARC report may be an example of the raw data source 404. The third-party server 140 may perform an initial data extraction 406 that extracts data from the DMARC report. For example, the DMARC report may include various different columns and rows. Each row may represent one or more instances of email transmission. The columns may include various metadata of the email transmission, such as the transmission server name, the transmission server IP address, domain name, selected header information of the email, any SPF or DKIM authentication information, etc.

The third-party server 140 may also perform initial enrichment 408. The initial enrichment 408 may center around the sending domain. The third-party server 140 may match the report to the organization 110 using the DMARC policy domain field. The third-party server 140 may also obtain other out-of-band metadata to enrich the records by searching for additional out-of-band information from the external data sources 153. For example, the third-party server 140 may enrich the IP address of the sender server with geolocation and other contextual information. The third-party server 140 may also investigate the authentication results of different groups of messages. If one or more authentication fails, the third-party server 140 may attempt to determine the failure reasons for the group. The third-party server 140 may further determine if the device is suspicious based on the authentication and policy verification results. A device may be unconfigured, misconfigured or new to the third-party server 140 for the server to be marked as potentially suspicious. The third-party server 140 may also determine if the recipient server's treatment of the email is congruent with the sender's policy with regards to SPF, DKIM, DMARC or other policy. For example, in some embodiments, there can be an override policy that overrides certain apparently suspicious activities to allow those activities. The third-party server 140 may also identify one or more instances of email transmissions that do not fall under the current policy of the organization 110.

The third-party server 140 may provide the enrichment results to the data store 410 for storage. The data store 410 may be a relational database for a pre-pattern search process. The data store 410, as discussed below, may also store improved data over time for sender identification and other types of device identification. The data may be used for the initial enrichment process 408 and may also be used in subsequent processes. The data store 410 may store different types of data such as the initial enrichment rules, sender identity correlation, and running lists of open items for correlation.

The data in the data store 410, especially those associated with devices that do not fall under existing policies, may be fed into a correlation engine 412. The correlation engine 412 is used to identify metadata that are important for the determination of the likely roles of those unknown devices. In some embodiments, the correlation engine 412 may sort and prioritize open items based on the commonality of selected metadata. For example, the correlation engine 412 may conduct statistical analysis on the metadata to select metadata that can be used to address most of the open items. The prioritization of certain metadata aims to address a large number of flows that need to be determined by the third-party server 140. In some embodiments, the correlation engine 412 may analyze metadata across the entire customer base. For example, various organizations 110 may retain the third-party server 140 to manage policies. The third-party server 140 may combine metadata of reports (e.g., DMARC reports) of various organizations 110 in determining prioritization of metadata.

A prioritized metadata listing 414 may be outputted by the correlation engine 412. The prioritized metadata listing 414 may be a workflow task that identifies the entity which appears to be sending emails on behalf of various organizations. Using the prioritized metadata listing 414, the third-party server 140 may perform a categorized search process 416 to identify relevant out-of-band information. The search process 416 may be conducted at one or more enrichment sources 418, which may be an internal database of the third-party server 140 or external data sources such as certain open source databases.

The categorized search process 416 may include one or more repeated enrichment between the third-party server 140 and the enrichment sources. For example, the third-party server 140 may get the metadata around a device or an entity associated with the device. The third-party server 140 may perform a search in one or more enrichment sources such as external data sources to determine relevant out-of-band information of the device or the entity. The out-of-band information may include the ownership chain of the email sending server business, the taxonomy of the email sending server, markets to which the email sending entity belongs, etc. The third-party server 140 may store the results in a DNS data store 420, which is an internal database for enrichment that may be shared with the DNS services of the third-party server 140. The third-party server 140 may also perform metadata sync 424, which synchronizes the newly identified service and information to the data store 410 to improve the metadata of the DMARC reports associated with the unknown devices. In turn, the third-party server 140 may perform the next round of refinement by prioritizing metadata at the correlation engine 412 and perform another categorized search process 416 until the likely role of a device is determined.

The third-party server 140 may include a recommendation engine 426, which may operate a guided workflow for an administrator of an organization 110 to make decisions around a recommendation provided by the third-party server 140. The recommendation engine 426 may perform comparisons between a recommendation and an actual policy. The recommendation engine 426 may also detect the disposition of customer workflows. The recommendation engine 426 may further trigger a change in the policy such as by causing the third-party server 140 to publish the modified policy in the DNS data based on the disposition of the customer workflows. For example, delegated authentication service engine 210 and/or configuration and policy engine 144 may publish one or more rule or data changes to delegated namespace zone 142.

The guided workflow may be displayed at the customer user interface (UI) 430. The customer, such as an administrator of the organization 110, may interact with the UI to accept or reject policy change recommendations. Customers may also manage configurations and policies at the UI and run reports from the UI. The customer UI database 428 may store policy recommendations. For representation to customers, the third-party server 140 may access data storage for sender identifier correlation and domain metadata (frequency of flows).

Guided Workflow and Policy Recommendations

Figure 5:
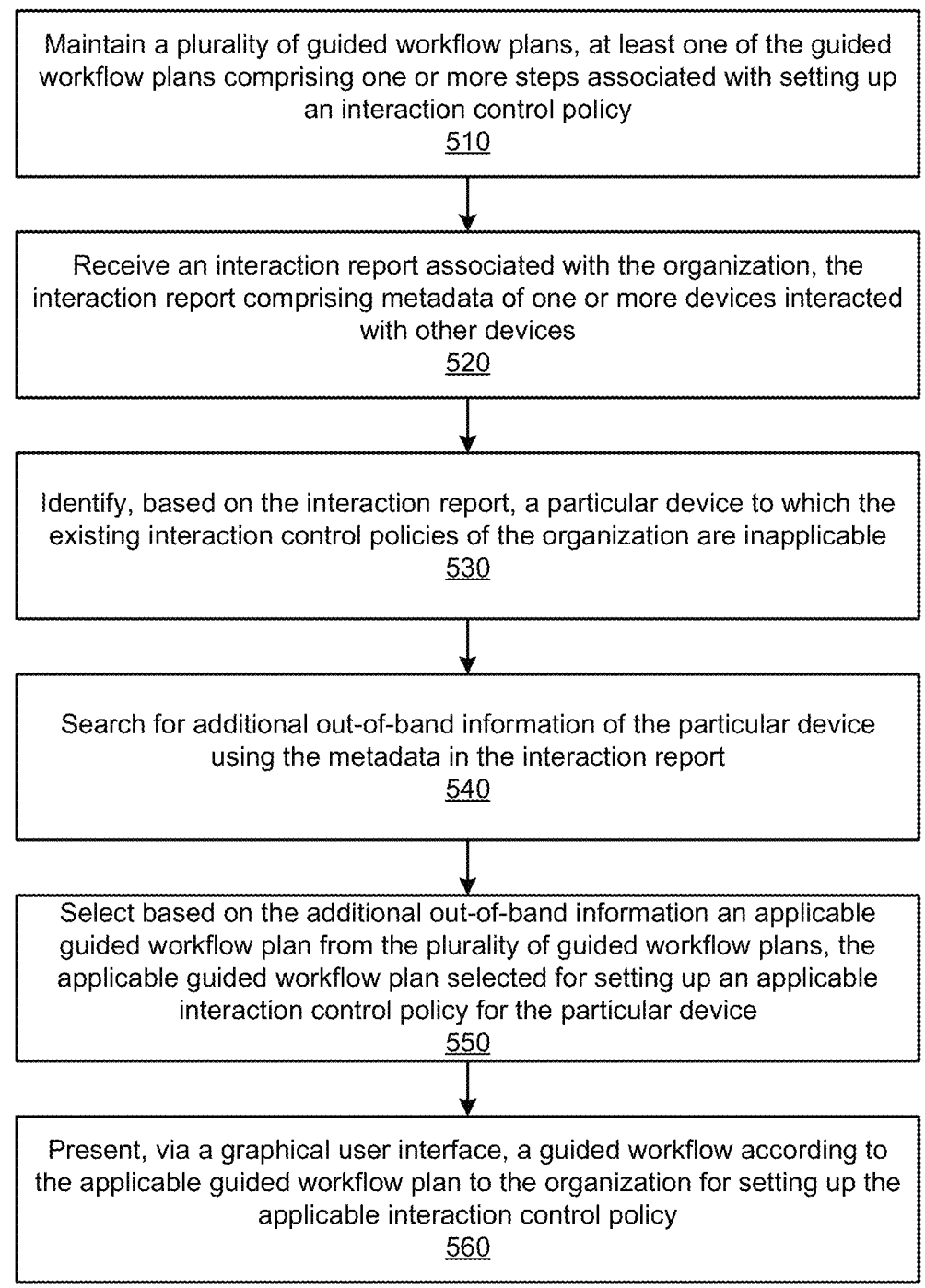
FIG. 5 is a flowchart depicting an example process for a third-party server to provide a guided workflow, in accordance with some embodiments.

FIG. 5 is a flowchart depicting an example process 500 that illustrates a software algorithm for a third-party server 140 to provide a guided workflow to an organization 110 to set up one or more policies such as interaction control policies, in accordance with some embodiments. The software algorithm may be stored as computer instructions that are executable by one or more general processors (e.g., CPUs, GPUs). The instructions, when executed by the processors, cause the processors to perform various steps described in the process 500. In various embodiments, one or more steps in the process 500 may be skipped or be changed. The third-party server 140 may be delegated by the organization 110 to manage one or more existing interaction control policies associated with the organization. Interaction control policies may refer to one or more policies that determine how devices in an application environment may interact with each other. For example, interaction control policies may control the authentication and authorization protocols, determine the roles of devices participating in an application environment, and define other suitable interactions in an application environment. An application environment may be an email environment, an IOT application, or another suitable environment where multiple devices interact with each other. By way of example of an email environment, interaction control policies may define policy framework (SPF) policies and domain keys identified mail (DKIM) policies to specify how emails associated with the organization 110 should be authenticated. In an IoT application, interaction control policies may define how IoT devices may authenticate each other using PKI identities and contextually such as based on geographical locations, timestamp, etc. Other interaction control policies may also include authorization policies and role defining policies that may limit certain actions of devices in an application environment. One or more interaction control policies may be maintained at the DNS of the organization 110 or another suitable namespace, which may or may not be delegated to the third-party server 140 for the management.

The process 500 automatically identifies a device to which existing interaction control policies of the organization 110 are inapplicable and selects and provides a guided workflow to the organization 110 to set up a new interaction control policy to address the situations related to that device. Upon identifying that the device has failed one or more existing interaction control policies, the third-party server 140 automatically conducts research to search for additional out-of-band information of the device to determine a likely role and characteristics of the device. In response, the third-party server 140 determines that one or more predetermined guided workflow plans may be applicable for the organization 110 to set up an additional interaction control policy for the device. The third-party server 140 presents the guided workflow via a graphical user interface to an administrator of the organization 110 for the organization 110. After the third-party server 140 receives information and selection provided by the organization 110 through the guided workflow, the third-party server 140 implements the new interaction control policy by changing one or more configurations of the application environment.

By way of example, the third-party server 140 may maintain 510 multiple guided workflow plans that are used for setting up various types of interaction control policies. A guided workflow plan may include one or more predetermined steps associated with setting up an interaction control policy. The steps may take the forms of questions, selections, open fields, matching and other suitable ways to seek information from the organization in order to complete the setup of a new interaction control policy. Each plan may be a predetermined flowchart that is straight or branched, sequential or nonsequential, cyclic or acyclic, and involves steps that are logically related to previous steps or not. Each plan aims to collect sufficient information for the third-party server 140 to set up an interaction control policy for a device such as a newly identified device. Several non-limiting examples of guided workflow plans are illustrated in FIGS. 6A, 6B, 6C, and 6D. Each plan may be specific to setting up one type of interaction control policy. For example, a first guided workflow plan may be used for setting up an authentication protocol and a second guided workflow plan may be used for setting up an authorization protocol. As discussed in further detail below, the third-party server 140 automatically conducts research on a newly identified device to determine what type of interaction control policy should be set up for the device. In turn, the third-party server 140 presents an applicable guided workflow plan to the organization 110 to set up a suitable interaction control policy. In various embodiments, the third-party server 140 may maintain those guided workflow plans by storing the instruction code related to those plans, metadata, parameters, pre-set questions and forms in a data store of the third-party server 140.

Various guided workflow plans may include metadata fields that define the characteristics of the plans and the triggering conditions of the plans. In one embodiment, the guided workflow plans may include metadata fields such as data source, events, required data elements, event producer, event consumer, filter, and other suitable fields. These are merely non-limiting and non-exhaustive examples of fields that may be associated with guided workflow plans in some embodiments. The data source field may define the type of report that is received by the third-party server 140 that will trigger a particular plan. For example, some plans are triggered by data identified in a first type of report while other plans are triggered by data identified in a second type of report. The reports may be authentication reports (e.g., DMARC reports), web application reports (e.g., reports generated by software applications provided by the third-party server 140), DNS scans, etc.

The events field may define the type of events that will trigger one or more guided workflow plans. Events can be any events, usually abnormal but not necessarily, that may trigger a warning in a reporting. Events may result from new devices not registered in the database of the third-party server 140, new accounts, improperly set-up devices, incomplete set up, unauthorized devices, domain issues, changes in device configurations, changes in DNS configurations, and other situations. Non-limiting and non-exhaustive examples of events may include detection of a new service (e.g., new email sending services, new IoT devices), detection of DKIM missing for a service that supports DKIM, failing of DKIM, detection of new signature in DKIM, detection of a new DKIM selector, possible DKIM found, unalignment of SPF, failing of SPF, detection of a new potential SPF domain, new account created, organization domain created, domain DNS configuration change and update, detection of certain specific domains, detection of new or existing services in MX records, detection of new or existing service in SPF records, detection of new or existing service in DKIM selector, DNS delegation issues. Some of the example events described herein may be specific to email systems, but other events or similar counterparts may be included in the event field for an IoT system.

The required data element field may specify the information needed by the third-party server 140 in order to trigger a particular guided workflow plan. For example, the third-party server 140 may need to verify certain status or identification of a device before an interaction control policy may be set up. The required data element field sets forth the data needed for the third-party server 140 to verify that a certain event has occurred in association with a particular device. The required data element may be evidence of a certain event that has occurred. For example, in order for the third-party server 140 to provide a guided workflow plan to set up an authentication protocol for a particular device, the third-party server 140 may need to first detect that a certain issue has occurred in association with the authentication of the particular device. In some cases, the required data element may also be used to provide information for the third-party server 140 to determine the selection between two similar plans. For example, an authentication failure reason for SPF may determine whether the device has an SPF unalignment issue or SPF failing issue. The third-party server 140 may determine the precise issue as to the SPF authentication to select a corresponding guided workflow plan. Non-limiting and non-exhaustive examples of required data elements may include service identification (e.g., email sender service identification), historical services of the organization 110, false or unverifiable DKIM signatures, new or unverifiable DKIM selector, false or unverifiable DKIM aligned signatures, DKIM failure reasons in DMARC report, SPF failure reasons in DMARC report, namespace record for a domain that is hosted by a particular server, newly created organization domain, MX record source, a change in service in the MX record, detection of unconfigured service, etc.

The event producer field and event consumer field may respectively specify the software algorithm that is used to determine the event and the software algorithm to invoke a particular guided workflow plan. For example, an event producer may be a software algorithm that conducts additional research on the device to automatically determine the information of the device based on out-of-band sources such as external data sources 153. Details of the determination of the out-of-band information are discussed in FIG. 4. The event consumer invokes a particular guided workflow plan for the organization 110 to generate a new interaction control policy. The filter field may set forth certain conditions that may filter or include certain plans.

The third-party server 140 may receive 520 an interaction report associated with the organization 110. Interaction reports may be external reports 155. The interaction report includes metadata of one or more devices or entities that interacted with other devices. The devices may be associated with different entities. For this disclosure, the parties that interact are referred to as devices but they may also be entities. Interaction reports may refer to documentation that record the interactions among devices in an application environment. The interactions can include new registration of devices, messaging among devices, authentication records (including failures, successes, and metadata) of devices, authorization records, action items, and other suitable interactions among an application environment. the interaction report may be specific to a single interaction or may be a compilation of multiple unrelated interactions. In various embodiments, there can be various kinds of interaction reports that are generated by different sources. For example, the third-party server 140 may be delegated by the organization 110 to manage part of or the entirety of an application environment. The third-party server 140 may generate an interaction report documenting the interactions managed by the third-party server 140. In some cases, the third-party server 140 may provide software in operating the application environment (e.g., emails). The report may be generated by the software. In some cases, other parties unrelated to third-party server 140 may also forward interactions reports to the organization 110, which may delegate the third-party server 140 to receive those reports. For example, in the setting of an email environment, a domain-based message authentication, reporting and conformance (DMARC) report is an example of an interaction report. Other parties, which may be email recipient servers, may regularly transmit DMARC reports that include metadata and authentication results of emails that are purportedly sent from the domain of the organization. Other examples of interaction reports include SMTP TLS Reporting (TLS-RPT) (Simple Mail Transfer Protocol Transport Layer Security Reporting).

An interaction report may include metadata of recorded interactions. The metadata may include the identities of devices, results of authentication (e.g., DKIM results and SPF results), results of authorization, metadata related to the devices, such as servers operating the devices, organizations operating the devices, device identities, and domains of the devices, contextual metadata such as timestamp, geographical locations associated with the devices, device types, etc. In some embodiments, an interaction report may be related to messaging among the devices. The metadata may include message headers, authentication information of devices, and message metadata.

In various embodiments and depending on the application environment, devices may interact with other devices in different ways. For example, interactions may include email communications, messaging between IoT devices, broadcasting of messages to multiple devices, actions performed in the application environment. In some cases, some of the devices may represent that the devices are acting on behalf of the organization 110. For example, an email delivering server may send emails on behalf of the organization 110. The email delivering servers may have different domain addresses and IP addresses than the organization 110. The interaction report may include records of the results of authentication of those email delivering servers to provide information as to whether a particular email delivering server is truly a legitimate server that sends emails on behalf of the organization 110.

The third-party server 140 may identify 530, based on the interaction report, a particular device to which the existing interaction control policies of the organization 110 are inapplicable. For example, the particular device may have failed an authentication protocol such as DKIM or SPF in the email setting. The authentication protocol may be one of the existing interaction control policies. There can be multiple situations where the existing interaction control policies are inapplicable to a device. For example, a policy may be inapplicable to a device because the policy is an incomplete policy, a wrong policy, or an irrelevant policy. An inapplicable policy may also arise when the policy raises a warning to the device or the policy is unable to be carried out given the presence of a device. In some cases, the third-party server 140 may also determine that there are no existing policies that can be applied to a device. For example, the device may be a newly registered device whose role and identity have not been properly determined in an application environment. In the setting of emails, a policy may be determined to be inapplicable to a new when authentication (e.g., DKIM and SPF) fails. The third-party server 140 may identify devices to which no policies are applicable based on the authentication results, warning, or other irregularities in the interaction report.

The third-party server 140 may search 540 for additional out-of-band information of the particular device using the metadata in the interaction report. The interaction report may include some out-of-band information. The third-party server 140 may conduct additional searching for additional out-of-band information from external data sources 153. The search may be done by an iterative process discussed in FIG. 4. The third-party server 140 may search for information related to event fields and required data element fields associated with various guided workflow plans. The out-of-band information may be related to the particular device or the services or organizations operating the devices. The out-of-band information may be searched through servers and data sources that may not be directly related to the application environment to determine additional information about the particular device that is not readily available in the messages sent by the particular device (e.g., in-band information) or in the interaction reports.

The third-party server 140 may select 550, based on the additional out-of-band information, an applicable guided workflow plan from the multiple guided workflow plan maintained by the third-party server 140. The applicable guided workflow plan is selected for setting up an applicable interaction control policy for the particular device. Examples will be discussed in FIGS. 6A-6D. The out-of-band information may match an event field or a required data element field in one of the guided workflow plans. Accordingly, the third-party server 140 may select that guided workflow plan.

By way of example, the additional out-of-band information may indicate that a service provided by the particular device supports an authentication protocol that has not been set up. The selected applicable guided workflow plan is used for setting up the authentication protocol. In an email setting, the third-party server 140 may identify from a DMARC report that an email delivering server has failed SPF authentication or DKIM authentication. The third-party server 140 may search for out-of-band information to determine whether that email delivering server supports SPF and DKIM. The out-of-band information indicates that the email delivering server supports DKIM while currently the interaction report indicates that the DKIM setup has resulted in a failure of the DKIM authentication. In turn, the third-party server 140, based on the out-of-band information, selects a guided workflow plan that helps the organization 110 to set up DKIM authentication for the email delivering server. If the out-of-band information indicates that the email delivering server does not support DKIM, the third-party server 140 may select another guided workflow plan to helps the organization 110 to remove any DKIM authentication currently set up with the email delivering server.

The additional out-of-band information may also indicate a likely role of the particular device. In an IoT application environment, the role of a device may determine the actions and authorization of the device. For example, a sensor may only be permitted to transmit a certain type of information but not other types of data that are not supposedly measured by the sensor. The third-party server 140 may identify the role of the device and automatically selects a guided workflow plan for the organization 110 to set up the authorization limit with respect to the device.

The selection of one or more applicable guided workflow plans may be partially based on the out-of-band information, but may also be based on other data. For example, in some messages, the headers and metadata of the messages may also provide information that matches an event field or a required data element field in one of the guided workflow plans. The headers and metadata, which are transmitted with the messages, may be considered in-band information that may also be used to select guided workflow plans. In an interaction report, the third-party server 140 may identify multiple devices that need to have policies set up. The third-party server 140 may provide a list of applicable plans for the organization 110 to go through the setup. An example of a list of applicable plans is shown in FIG. 7B.

The third-party server 140 may present 560, via a graphical user interface, a guided workflow according to the applicable guided workflow plan to the organization 110 for setting up the applicable interaction control policy. An administrator of the organization 110 may go through and complete the workflow to set up a new interaction control policy. A new interaction control policy may be a completely new policy or a modified version of an existing interaction control policy. In presenting the guided workflow, the third-party server 140 may send a recommendation to the organization 110 for a potential modification to an existing interaction control policy. In some cases, the guided workflow may include one or more questions or suggested actions for the organization 110 to characterize the device. The third-party server 140 may receive a selection, such as an approval, from the organization. The third-party server 140, based on the selection of the new interaction control policy, implements automatically the modification to reflect the selection. The third-party server 140 may automatically adjust the configurations, such as rules and records reflected in the DNS of the organization 110 on behalf of the organization. Examples of the visualizations of the guided workflow displayed in a graphical user interface are shown in FIGS. 7A-7E.

Figure 6A:
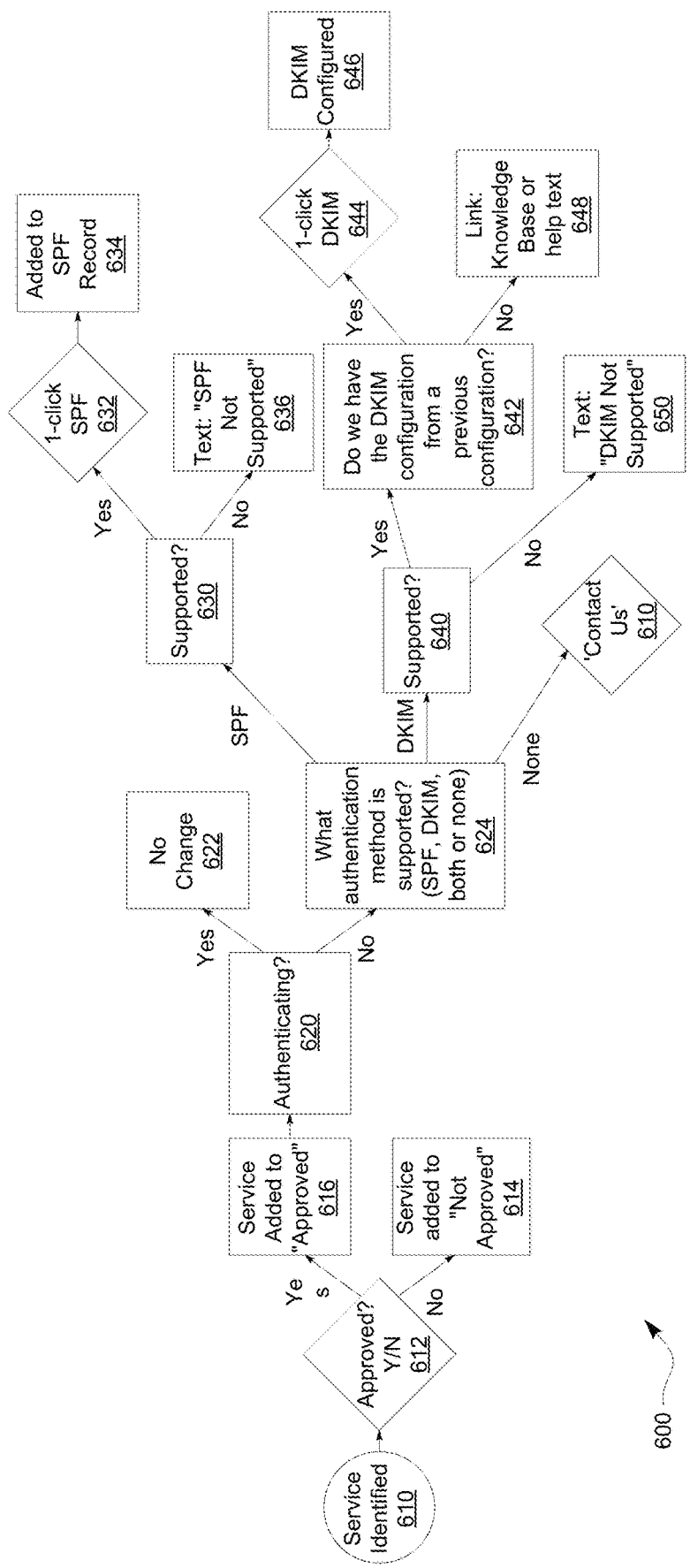
FIGS. 6A, 6B, 6C, 6D are flowcharts illustrating examples of guided workflow plan, in accordance with some embodiments.

FIG. 6A is a flowchart illustrating an example of a guided workflow plan 600, in accordance with some embodiments. The guided workflow plan 600 is merely one example of guided workflow plans that are maintained by the third-party server 140. In some embodiments, the third-party server 140 stores a plurality of different plans to set up different types of interaction control policies.

The guided workflow plan 600 is a directional and branched plan that is used to set up a new email service in an email application environment. The guided workflow plan 600 may begin with a page 610 that displays that a new service is identified. For example, the third-party server 140 may have detected that the organization 110 has retained a new email delivering server to send emails on behalf of the organization 110. The new email delivering server is the new service in this example. On the page 610, the third-party server 140 may show evidence as to why the server believes the newly identified service is a new service. The evidence may include out-of-band information that is searched from various sources. At decision stage 612, the third-party server 140 receives a selection from the organization 110 to decide whether to approve the new service. If the organization 110 does not approve the service, the service is added to a "not approved" list in step 614. If the organization approves the service in step 616, the service is added to an approved list.

The guided workflow 600 proceeds to an authentication setup at step 620 to determine whether emails sent using the new service are authenticated properly. If so, there is no further set up and the guided workflow 600 ends at step 622. If the emails are not authenticated properly, the guided workflow 600 displays a series of steps for the organization 110 to set up various authentication protocols. The guided workflow 600 determines what authentication method is supported by the new service at step 624. This may be obtained from out-of-band information that is generated from researching the protocols supported by the entity operating the new service.

At step 630, if the third-party server 140 determines that the new service supports SPF, the guided workflow provides a setup wizard 632 of a one-click SPF and, at step 634, add the configuration to the SPF record in the DNS of the organization 110. If the third-party server 140 determines that the new service does not support SPF, the guided workflow provides the text of "SPF Not Supported" at step 636. At step 640, if the third-party server 140 determines that the new service supports DKIM, the third-party server 140 further reviews its record to determine, at 642, whether the third-party server 140 has stored a previous DKIM configuration. If so, the guided workflow provides a setup wizard 644 of a one-click DKIM and, at step 646, sets up the DKIM configuration. If the third-party server 140 determines that it does not have a previous DKIM configuration, the guided workflow provides a link on knowledge-based or help text to the organization 110 at step 648. If the third-party server 140 determines that the new service does not support DKIM, the guided workflow provides the text of "DKIM not supported." If the third-party server 140 determines that the new service supports neither SPF nor DKIM, the third-party server 140 may provide a page 650 to ask the organization administrator to contact the third-party server 140.

Figure 6B:
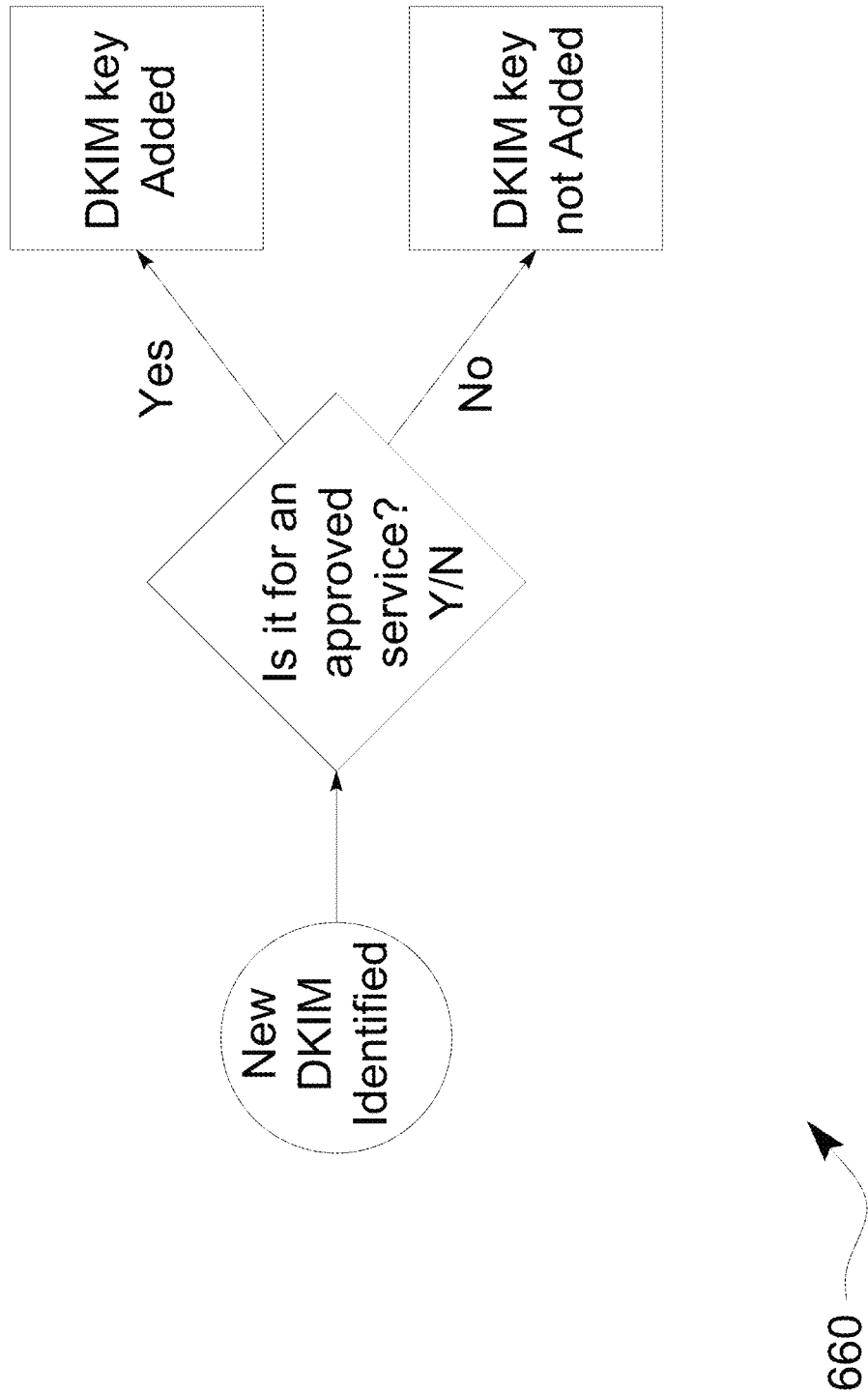
Figure 6C:
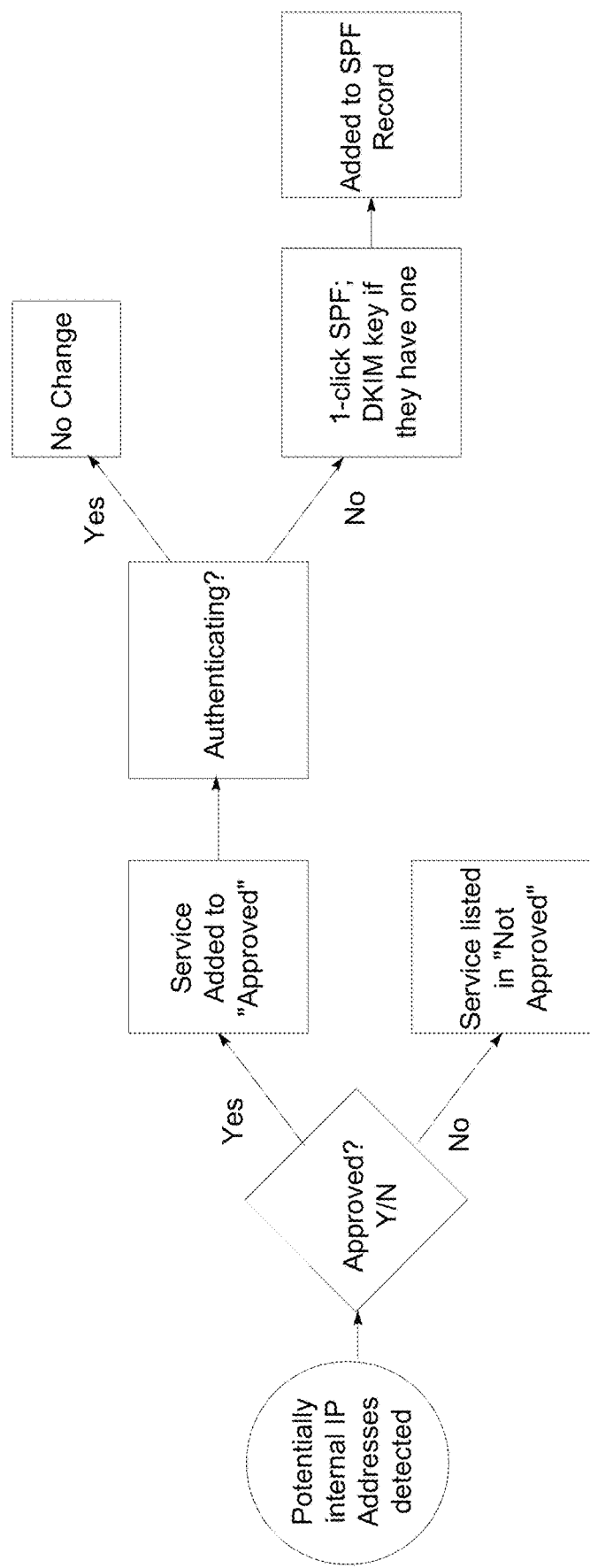
Figure 6D:
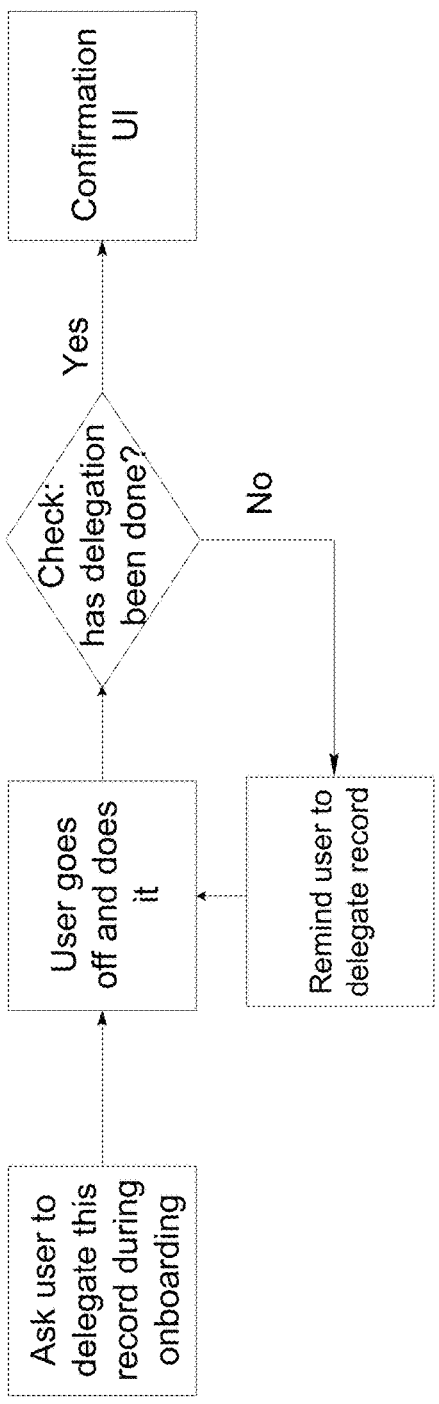
Figure 6D:
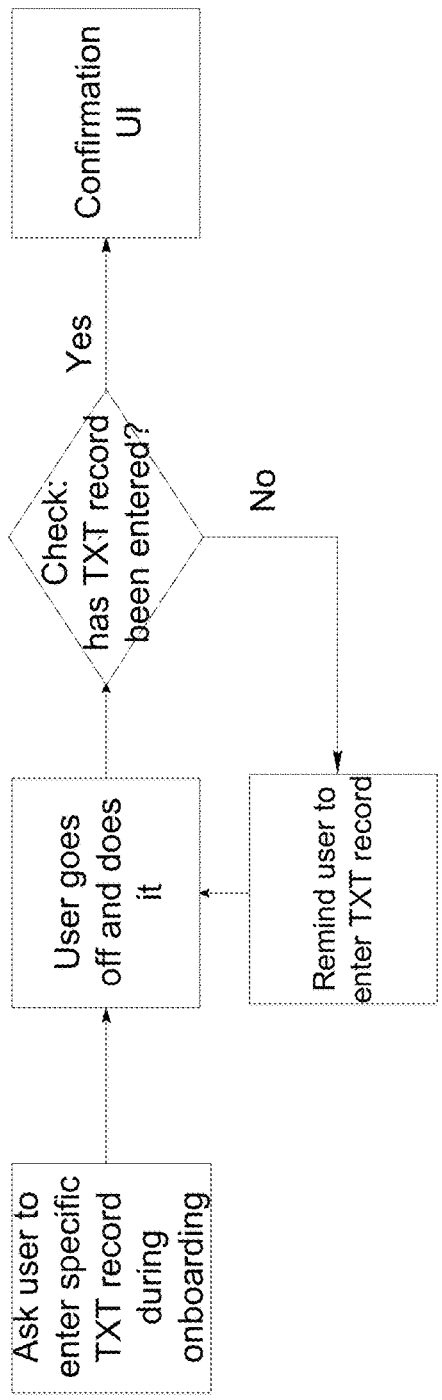

The guided workflow plan 600 is merely one example of the guided workflow plan that may be maintained by the third-party server 140. FIG. 6B through 6D shows additional guided workflow plans that are used for other interaction control policies. The guided workflow plan 660 shows a workflow for DKIM key discovery. The guided workflow plan 670 shows a workflow for a likely netblock detection. The guided workflow plan 680 shows a workflow for delegating DNS records for a domain.

Figure 7A:
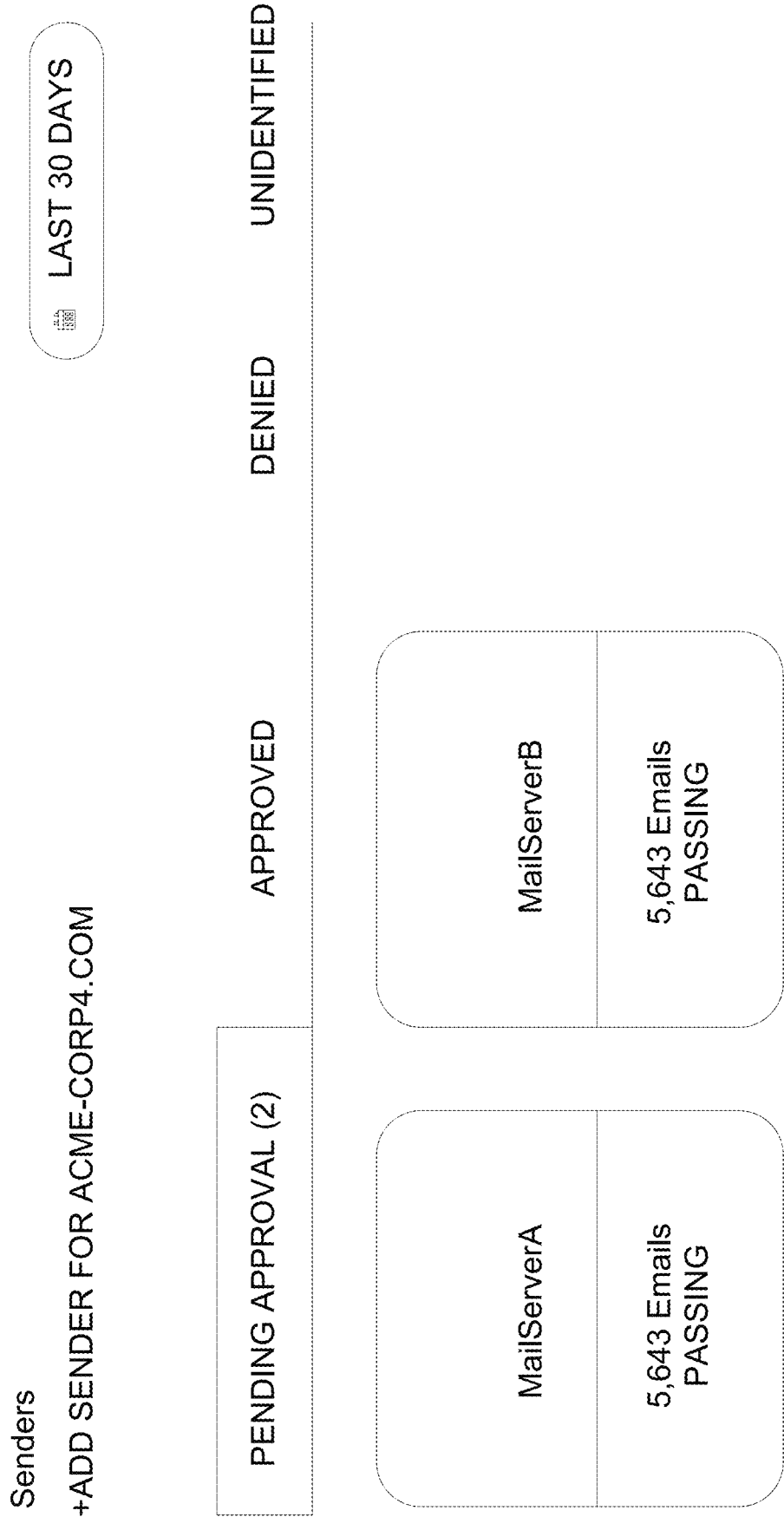
FIGS. 7A, 7B, 7C, 7D, and 7E are conceptual diagrams illustrating example graphical user interfaces that display various pages of an example guided workflow plan, in accordance with some embodiments.
Figure 7B:
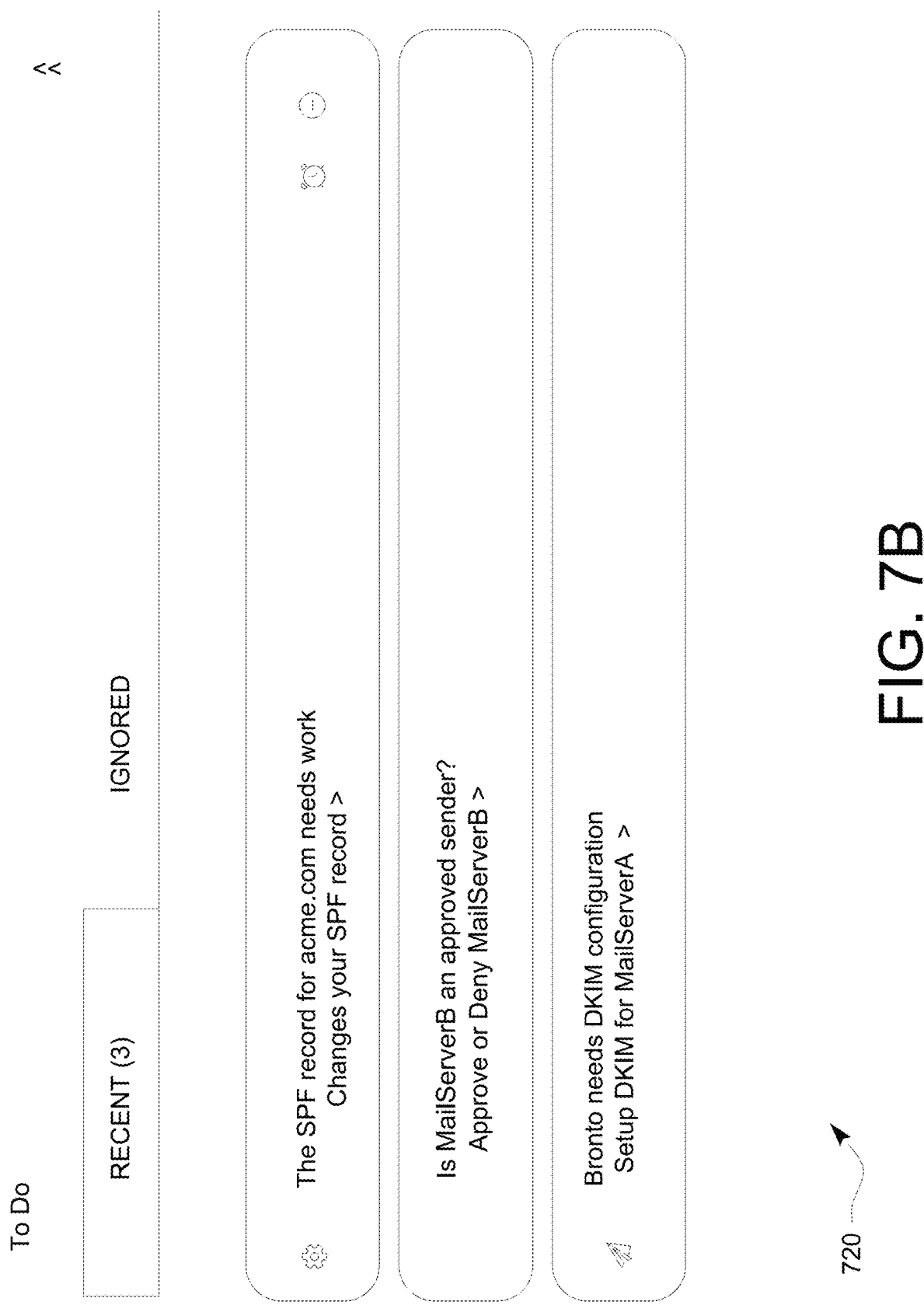

FIG. 7A through 7E depicts conceptual diagrams illustrating example graphical user interfaces that display various pages of an example guided workflow plan, in accordance with some embodiments. The pages shown in the graphical user interface may correspond to the guided workflow plan 600. In FIG. 7A, the graphical user interface page 710 displays new services that have been identified by the third-party server 140. The new services may be email delivering servers that are delegated by the organization 110 to send emails on behalf of the organization 110. The third-party server 140 may identify the new services from an interaction report, such as a DMARC report. The page 710 shows a list of new services that need to be approved or rejected by the organization 110.

Figure 7C:
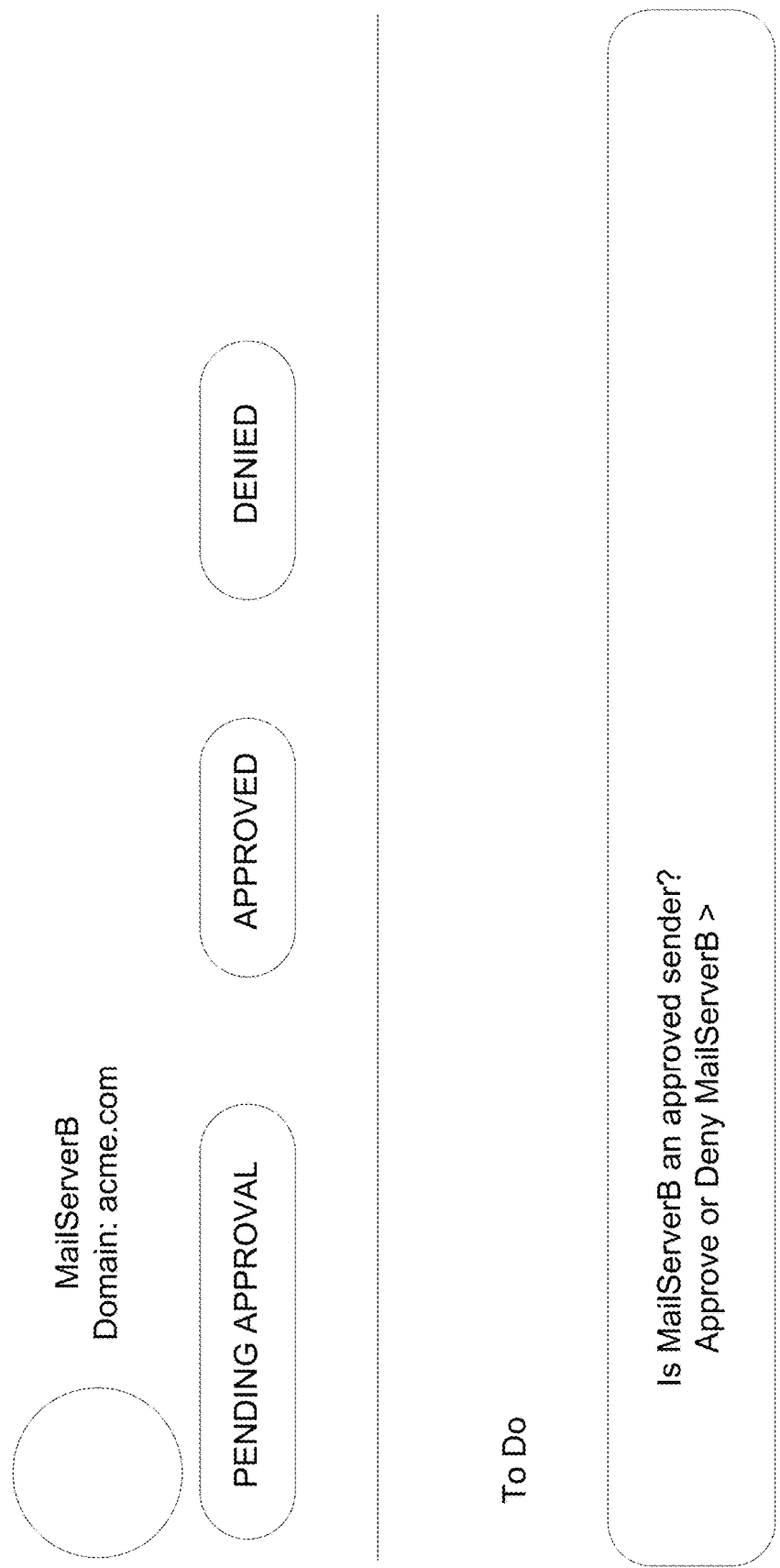
Figure 7D:
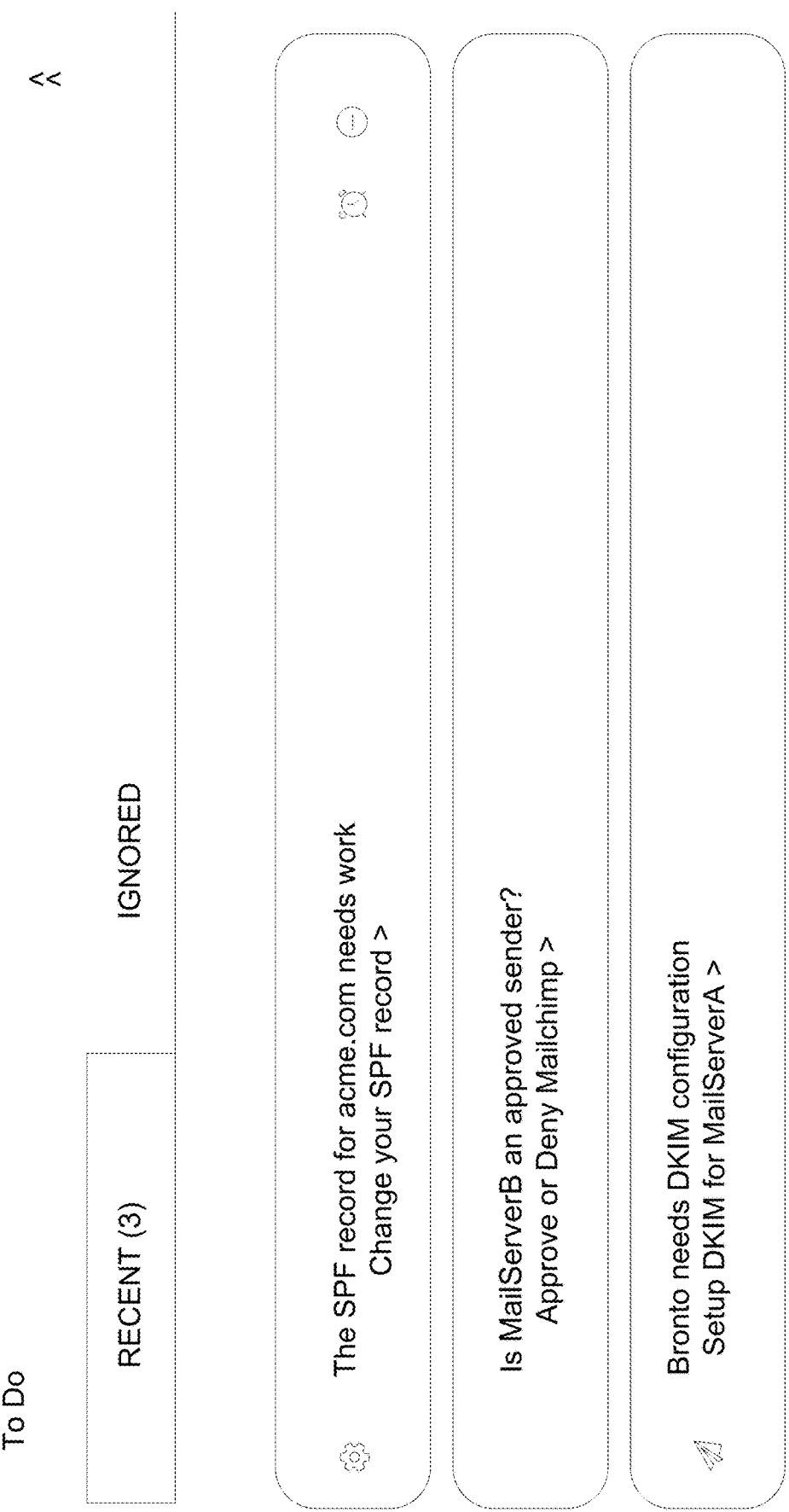
Figure 7E:
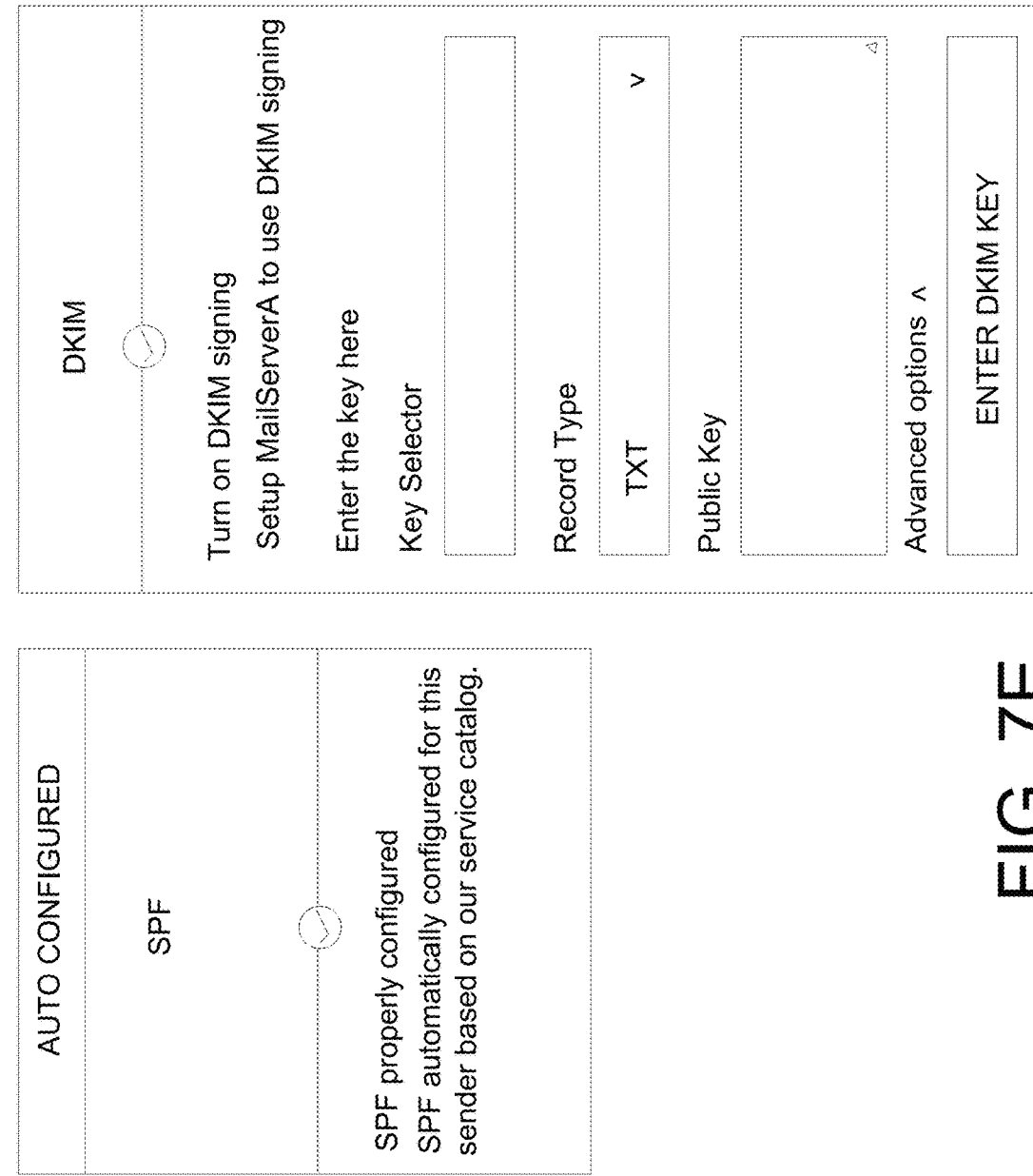

In FIG. 7B, the graphical user interface page 720 is displayed after an organization administrator selects one of the new services. The page 720 shows a list of tasks that may be completed by the organization 110. The list of tasks may correspond to various branches in the guided workflow plan 600. For example, the tasks may include having the organization to set up SPF and DKIM and to approve the new service. In FIG. 7C, the graphical user interface page 730 shows a step for the organization 110 to approve or deny a new service. The page 730 also displays the authentication protocol setup status associated with the new service. In FIG. 7D, the graphical user interface page 740 shows a step for the third-party server 140 to provide information and guides on how to enable SPF by providing a TXT record for the organization 110 to update its DNS. The page 740 may also allow the organization 110 to refresh the DNS to check if the SPF has been properly implemented. In FIG. 7E, the graphical user interface page 750 shows a step for the organization 110 to set up DKIM. The organization 110 may enter the key selector and the public key on the page 750. After the information is entered, the third-party server 140 may automatically implement the DKIM setup. A new interaction control policy is thus created and completed.

Detailed Policy Recommendation Examples

Figure 8A:
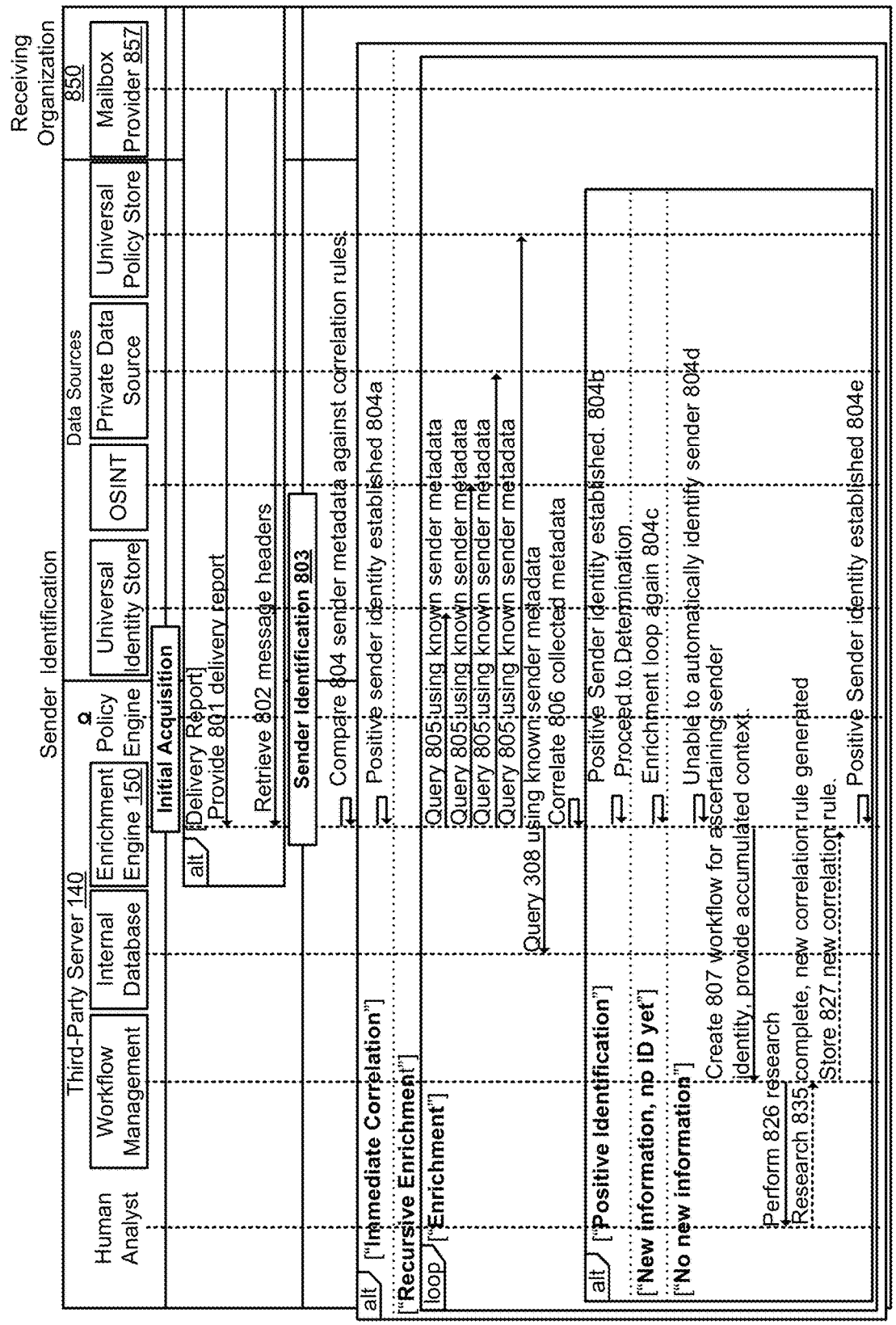
FIGS. 8A and 8B, combined, depict a flowchart illustrating a policy recommendation process, in accordance with some embodiments.
Figure 8B:
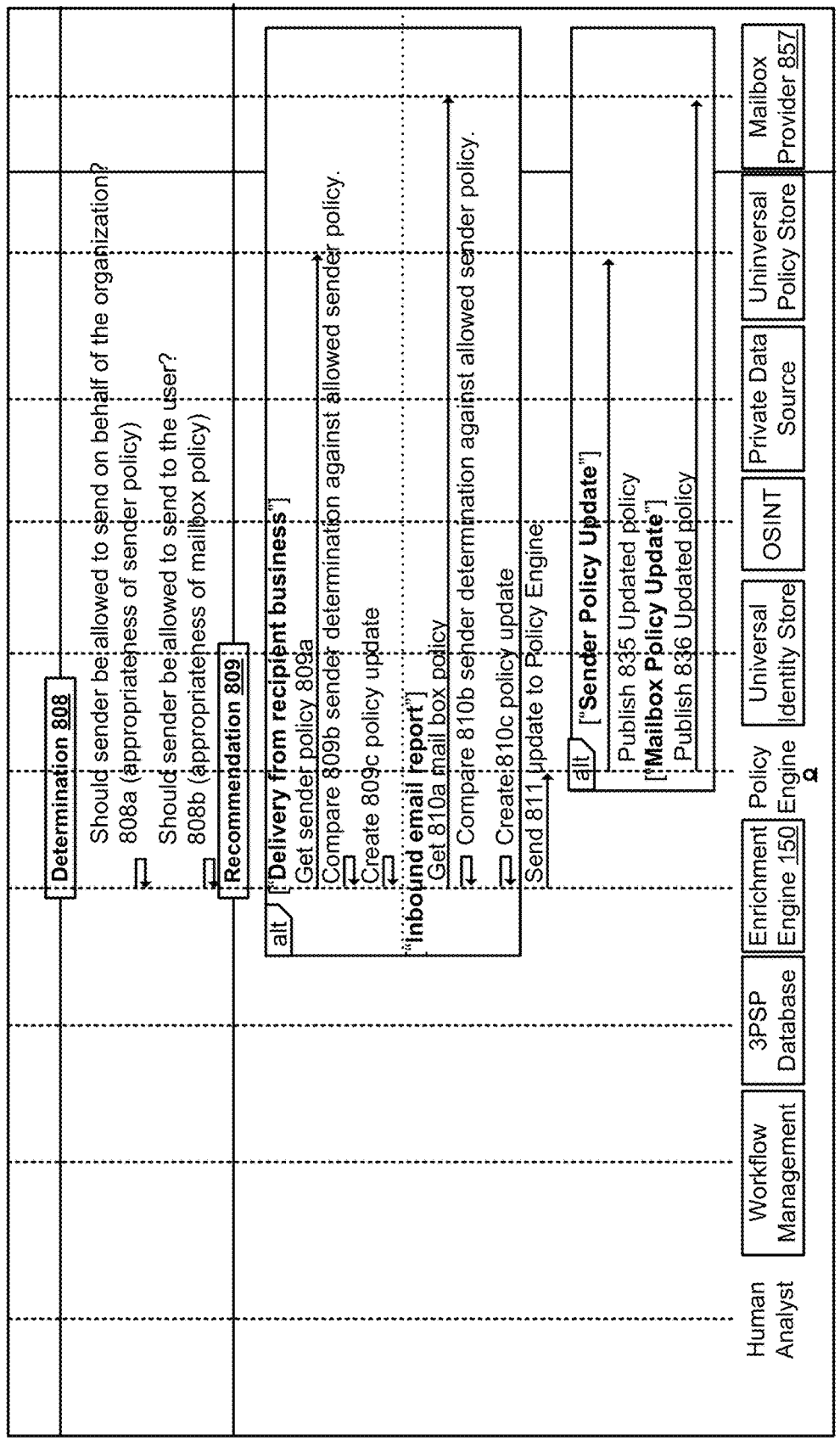

FIGS. 8A and 8B, combined, depict a flowchart illustrating a more detailed example of a policy recommendation process illustrated in FIG. 3. In FIG. 8A, a transmitter device 170 has already sent the message 151 to the receiving organization 850. FIG. 8A begins with the mailbox provider 857 of the receiving organization 850 sending in step 801 an authentication report 155 to the enrichment engine 150. Now begins the process of repeated enrichment within the enrichment engine 150. This process starts in step 803 which represents the beginning of the Sender Identification phase. In step 803, the enrichment engine 150 compares the received sender metadata to its own set of Correlation Rules 221.

In step 804, the enrichment engine 150 assesses whether it has positively established the identity of the message sender. The enrichment engine 150 performs this assessment at multiple points of the workflow management 225 process. The first such point is step 804a at which the enrichment engine 150 assesses whether its Correlation Rules 221 match the sender metadata. If they do match, the processing jumps to step 808 in the Determination phase. If they don't match, the method continues with step 805.

At step 805, the enrichment engine 150 issues a query using the known sender metadata. The engine issues this same query to one or more sources, including internal third-party server data sources such as the universal identity store, Universal Policy Store, and third-party server database, and external data sources such as OSINT, and Private Data Sources.

AT step 806, the enrichment engine 150 generates new correlation rules 221, if possible, based on the responses it receives from the one or more queries of step 805. At this point, the enrichment engine 150 tests whether the new correlation rules match the sender metadata. If they do match (at step 804b), the processing jumps to step 808 and the determination phase.

At step 804c, the match fails, and the refinement ensues when the processing jumps back to the querying of step 805. This step is repetitive since the correlation rules newly generated in step 806 modify, and refine the next query at step 805. For example, a correlation step may start with an IP address of a sending server. The correlation process may perform a reverse lookup (PTR record) for the DNS name corresponding with the IP address, and a WHOIS lookup to determine the NIC (network information center) handle of the organization responsible for the network subnet containing the sending server. From the contact information associated with the NIC handle and the domain name of the reverse DNS lookup the enrichment engine 150 may obtain confirmation of the entity that owns the physical infrastructure. This only identifies the responsible party for the physical and network infrastructure. This cycle produced more information, but did not arrive at a conclusion of the actual owning entity. Further correlation cycles may refine the analysis, by using the domain name from the PTR record, or the name of the company from the NIC handle, to discover the entity behind the network operator, using a business registry.

At step 804d, the enrichment engine 150 determines that no further significant refinement is feasible. At this point, the enrichment engine 150 performs step 807 at which it collaborates with workflow management to create a workflow for ascertaining the sender's identity.

This workflow begins with step 826 where workflow management provides the accumulated research of the enrichment engine 150 to a human analyst, requesting the analyst to continue this research into the sender's identity. The human analyst performs this research, and delivers it to workflow management via step 835. Based on their received human research, workflow management stores one or more new correlation rules 221 in the enrichment engine.

Having received these new one or more correlation rules, the enrichment engine 150 now compares these new rules to the sender metadata. At Step 804e, the enrichment engine 150 determines that a match has been made and moves on to the determination phase.

The determination phase begins with step 808 in which the enrichment engine 150 assesses the scope of the sender's sending permissions. At step 808a, the enrichment engine 150 determines whether the sender is allowed to send on behalf of the organization (impacting the sender policy); in step 808b, whether the sender is allowed to send to the user (impacting the mailbox policy).

At steps 809 and 810, the enrichment engine 150 records the results of the determinations of step 8. Step 809 concerns the sender policy and step 810 concerns the mailbox policy. At step 809a, the enrichment engine 150 gets the sender policy from the universal policy store 832. At step 809b, the enrichment engine 150 compares the sender determination (from the foregoing determination phase 808) with the sender policy. Finally, at step 809c, the enrichment engine 150 creates a sender policy update, if necessary.

Steps 810 are the same as step 809, except that in the latter, it is the mailbox policy of the mailbox provider 857 that is updated, rather than the sender policy of the universal policy store.

The processing of the enrichment engine 150 ends with step 811 in which the engine sends an update to Policy Engine 830 concerning the former's determination.

FIG. 8 concludes with steps 835 and 836 in which the policy engine updates the sender policy and mailbox policy, respectively, according to the determinations received from the enrichment engine 150.

Example 1: IoT

In an embodiment in which IoT application owners need to manage a fleet of devices with a high rate of change, keeping an up-to-date policy is essential to providing safe and reliable service.

In an example of this dynamic, an environmental air quality service owns a domain called "example.com". Example.com has an API server located at api.example.com. Example.com contracts with third party implementers to manage and maintain the physical devices which run example.com's collection of software.

A third party implementer, example.io, manages devices for example.com as well as a number of other environmental air quality monitoring services. Since the industrial focus is narrow, example.com is able to use the same hardware for all customers serviced by example.io.

Pursuant to its contract with example.com, example.io provides environmental monitoring services by geolocation. As a matter of good security hygiene and providing a highly-available service, example.io periodically physically swaps devices in the field, and rotates the asymmetric key pair used for authenticating the device. Each device has a name in the DNS which is associated with a public key, and each device has its own private key which corresponds to the public key in DNS.

Since the devices all have public keys in DNS used for authentication, rotating credentials smoothly is a matter of replacing the public key in DNS when the device's private key changes. A policy which names each device by DNS name (e.g. "device123.example.com") allows devices to rotate credentials and maintain service quality without adjusting policy.

A device maintains its own present geolocation in DNS, associated with its name. The example.io organization maintains a public data set of device-to-service assignments.

When example.io removes a device from service and installs one it its stead, example.io first assigns the device to the application in the public data set. When the new device is placed in-service and powered on, it first updates its geolocation in the DNS and then looks to the public data set to see where it should send its observations to.

Having done so, the device sends authenticated observations to the intended target service—in this case, api.example.com. The failed authentication attempts from the newly-provisioned device against api.example.com then trigger a policy assessment via the enrichment engine.

The enrichment engine uses the public data set to confirm that example.io has assigned the device to the api.example.com service, and the enrichment engine may use the DNS to discover the device's geolocation. If the device is in a permitted geolocation, and if example.io is a trusted vendor, and if example.io has appropriately assigned the device to the api.example.com service, and if the messages are signed by the public key corresponding to the device's public key in DNS, then there exists a complete feedback loop whereby the enrichment engine may automatically change the policy to allow the new device to contribute information to the application.

Example 2: B2B Microservices

Figure 9:
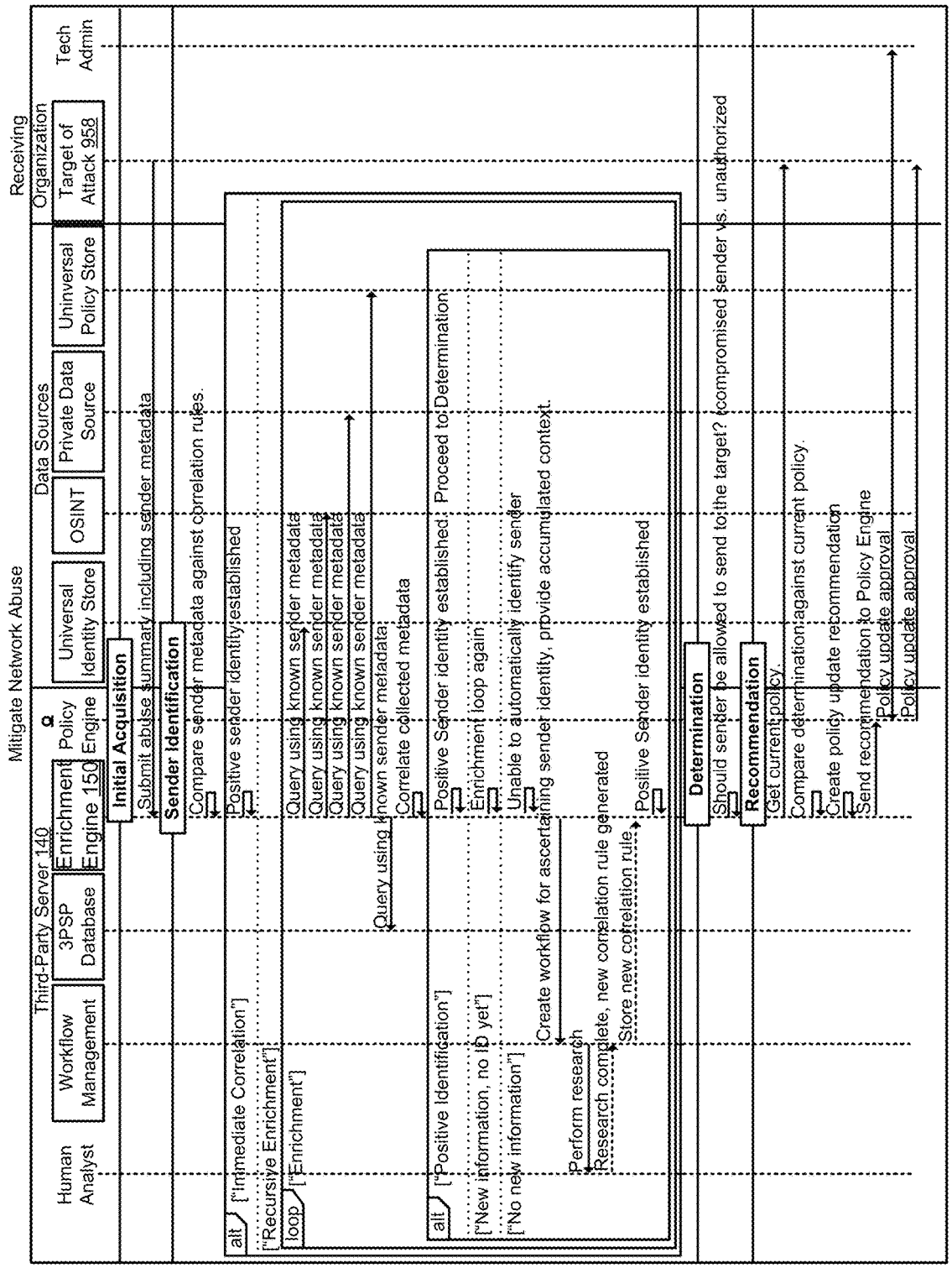
FIG. 9 is a flowchart illustrating a policy recommendation process, in accordance with some embodiments.

FIG. 9 shows an embodiment in which microservices on the Internet need to authenticate across organizations, there is a need to keep the policy as narrow as possible to mitigate network abuse. FIG. 9 is the same as the general case method shown in FIGS. 8A and 8B, with two exceptions. The first is that the sender of the authentication report 155 is a target of attack 958 looking to prevent abuse instead of mailbox provider 857.

The second exception is that the determination and recommendation phases of FIG. 9 are simpler than those of FIGS. 8A and 8B. Whereas the determination phase of FIGS. 8A and 8B asks two questions, the same phase of FIG. 9 asks only one of the two (specifically, "should sender be allowed to send to target"). Also, whereas FIGS. 8A and 8B concern both a sender policy and a mailbox policy, FIG. 9 concerns only a single policy.

In an example of this network abuse mitigation dynamic, an organization's marketing department with URL marketing.example.com needs to accept information from an analytics company via API. The API is located at api.marketing.example.com. The analytics organization is called analytics.example.net. The Policy Engine describes the trust relationship between these organizations as: "api.marketing.example.com may accept information from analytics.example.net".

If example.net sells its analytics business to another business, for example "example.parent", the policy needs to change to accommodate a new sending domain, and after the transition is done, the old sending domain needs to be removed from the policy.

Api.marketing.example.com sends an authentication accounting report to the third-party server 140 which describes the authentication events for api.marketing.example.com. The enrichment engine may then see successful authentication from analytics.example.net. Example.net transfers control of the analytics service to example.parent, and api.marketing.example.com begins to observe failed authentication attempts from analytics.example.parent.

The enrichment engine is able to discover the transfer of ownership of example.net's analytics business to example.parent, via OSINT or other means. The enrichment engine alerts the Tech Admin that this transfer has occurred and asks the user if authentication attempts from the new parent company's domain (analytics.example.io) should be allowed by the service located at api.marketing.example.com. In the request, the enrichment engine may provide the Tech Admin with information about the acquisition, in addition to the date that the old service will be retired. The Tech Admin may decide to accept a future change to the policy which allows the enrichment engine to automatically remove the original service's identity at the expected retirement date.

Automatically removing the original identity at the date of termination may prevent a future domain owner from impersonating the original owner.

With this workflow complete and accepted by the Tech Admin, other organizations which are customers of the third-party server 140 that also use the analytics service may automatically receive a policy recommendation based on the first customer's accepted recommendations.

Example 3: News Syndication

Figure 10:
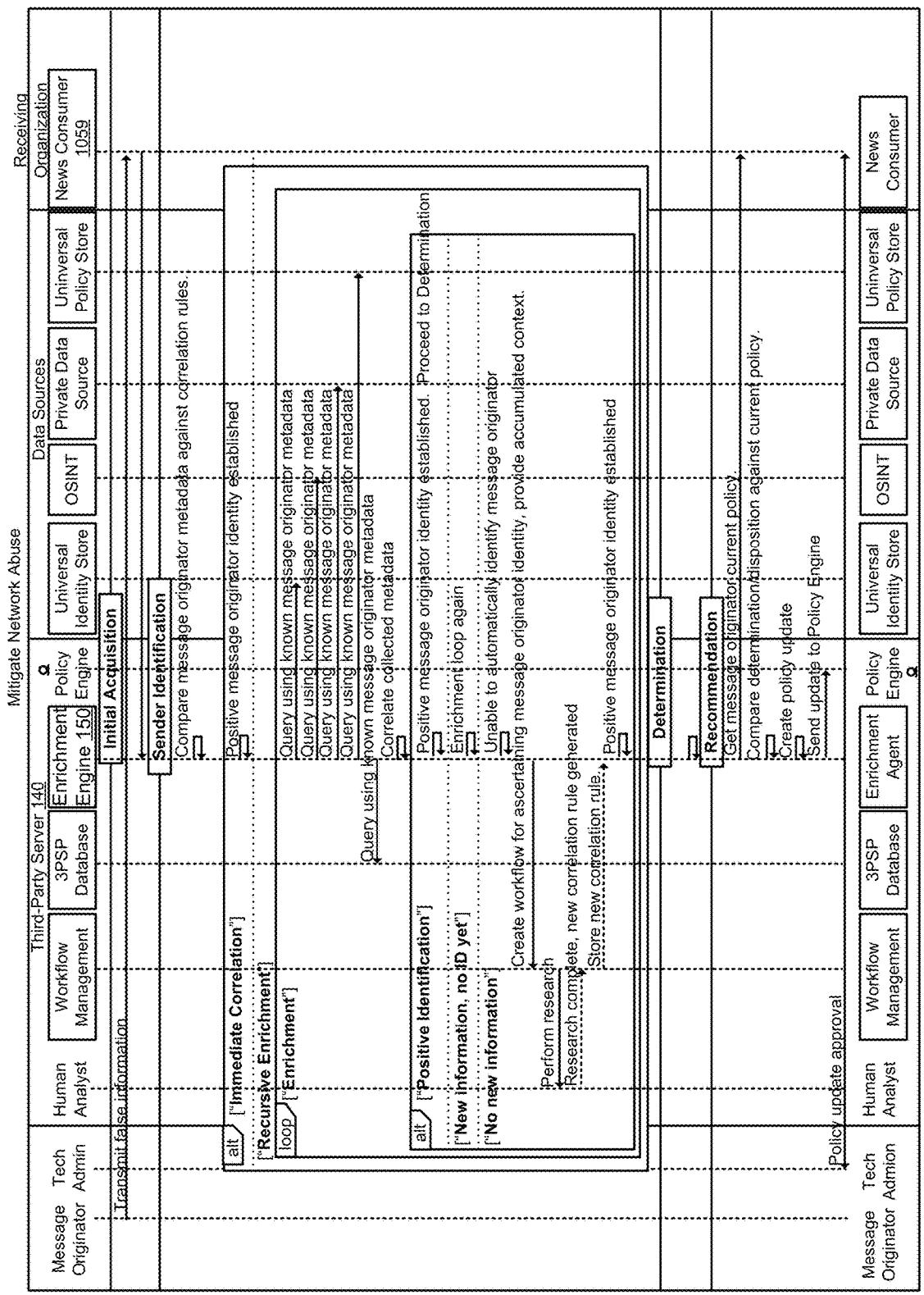
FIG. 10 is a flowchart illustrating a policy recommendation process, in accordance with some embodiments.

FIG. 10 shows an embodiment in which news production companies produce content which is syndicated by other parties, and delivered to consumers, a news production company is interested in ensuring that the original content is represented honestly when it is delivered to the consumer. FIG. 10 is the same as FIG. 9, with three exceptions. The first is that the sender of the authentication report 155 is a news consumer 1059 reporting a content error rather than a target of attack 958 looking to prevent abuse.

The second exception is that at the end of the work performed by the enrichment engine, a human, tech admin representing the sending service, takes an active role in approving updates to the policy. In FIGS. 8A, 8B and 9, these updates occur automatically.

The third exception is the inclusion in FIG. 10 of the message originator who sends the initial message that kicks off the activities similar to those shown in FIGS. 8A and 8B. The reason that FIG. 10 shows the message originator is that the message in this figure comprises false information.

In this embodiment, the news production company is the message originator, the syndicator is the sending service, and the consumer represents the receiving organization.

The news production company may attach a digital signature to a story, and make it available to syndicators. The syndicators may then transmit the signed content, as well as commentary on the original content. This may also involve the use of formatting in the digital representation to highlight a statement or excerpt from the original content. The whole document, as-delivered to the consumer, is signed by the syndicator, and this contains the original document as well as any mark-up from the syndicator.

The news production company publishes a policy which represents all allowed syndicators of the news production company's content.

The consumer may use a combination of policies, including the news production company's syndication policy, to discover news articles.

The consumer reads the story as presented by the syndicator, and authenticates the digital signatures on the original content as well as the syndicator's additions using a method described in U.S. Provisional Application No. 63/057,814.

The consumer may report to the news production company when a syndicator changes the content and breaks the original content's digital signature. In this case, an investigation may take place through automated means or with human assistance which can determine whether the original content was changed. If the original content's signature was broken, and the syndiactor's signature was not, a breach of trust via misrepresentation of the original content may have occurred, and the news production company may remove the dishonest syndicator from the policy of allowed syndicators. This is a determination which can be arrived at through automated means, with little or no human intervention.

If the consumer compares the commentary and markup offered by the syndicator and discovers that quotes are taken out of context and misrepresent the original intent of the news production company's content, the consumer may report this to the news production company. A workflow like this may not be able to rely solely on digital signatures, and may rely instead on tools like automated sentiment analysis, together with human reasoning, to arrive at a conclusion as to whether content has been dishonestly represented. In other cases a guided workflow may be used to reduce the time required for the news company's technical administrator to determine if a syndicator should be removed from the list of approved syndicators.

Computing Machine Architecture

FIG. 11 is a block diagram illustrating components of an example computing machine that is capable of reading instructions from a computer-readable medium and executes them in a processor (or controller). A computer described herein may include a single computing machine shown in FIG. 11, a virtual machine, a distributed computing system that includes multiple nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in various figures, such as various servers and devices shown in FIG. 1A, various engines and modules shown in FIG. 2. While FIG. 11 shows various hardware and software elements, each of the components described in FIG. 1A may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer"

may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1100 may also include a memory 1104 that stores computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1102 and reduces the space required for the memory 1104. For example, the machine learning methods described herein reduces the complexity of the computation of the processors 1102 by applying one or more novel techniques that simplify the steps in training, reaching convergence, and generating results of the processors 1102. The algorithms described herein also reduces the size of the models and datasets to reduce the storage space requirement for memory 1104.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though the specification or the claims may refer to some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processors 1102, displays a graphical user interface (GUI) to display one or more results and data generated by the processes described herein. The computer system 1100 may also include an alphanumeric input device 1112 (e.g., a keyboard), a cursor control device 1114 (e.g., a mouse, a trackball, a joystick, a motion sensor, or another pointing instrument), a storage unit 1116 (a hard drive, a solid state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Using a third-party server 140 as a delegation service for distributing secure messages has various benefits over the organization 110 performing the distribution because: (1) the third-party server 140 sees a lot more parties than does the organization, since the third-party server 140 may provide various services for many other organizations, (2) researching the reputation of a new party is too onerous for an organization, and the third-party server 140 is better situated for this because it sees the widest span of parties, good and bad (3) when business policies change or evolve, propagating the effects of these changes can be too much for the client, so using the third-party server 140 to propagate the changes is much easier. Policies may be automatically and continually improved, as organizational relationships change, which increases the level of difficulty for a bad actor to abuse the system. Human interaction is minimized for the process of policy curation, and human learnings are translated into correlation rules which are used by the enrichment engine to avoid repetitive human action.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system comprising:
  a computing server that comprises one or more processors and memory configured to store computer code comprising instructions, the instructions, when executed by the one or more processors, cause the one or more processors to:
    maintain a plurality of guided workflow plans, at least one of the guided workflow plans comprising one or more steps associated with setting up a policy;
    receive a Domain-based Message Authentication, Reporting and Conformance (DMARC) report associated with a first domain, the computing server being delegated by the first domain to receive, on behalf of the first domain, the DMARC report, wherein the first domain is associated with one or more DMARC policies specifying how emails purportedly originated from the first domain are handled, the DMARC report comprising data of IP addresses attempting to send one or more emails on behalf of the first domain to an recipient server generating the report;
    identify an entity in the data of the DMARC report;
    identify metadata associated with the entity;
    search additional information to determine a nature of the entity; and
    select, based on the additional information, an applicable guided work plan from the plurality of guided workflow plans; and
  a graphical user interface of a software application in communication with the computing server, the graphical user interface configured to present, according to the applicable guided work plan, a guided workflow for setting up a policy to be associated with the entity.

2. The system of claim 1, wherein the plurality of guided workflow plans comprise a first guided workflow plan for setting up an authentication protocol.

3. The system of claim 1, wherein the plurality of guided workflow plans comprise a second guided workflow plan for authorizing an entity.

4. The system of claim 1, wherein the entity is identified as a sender that fails an authentication protocol.

5. The system of claim 4, wherein the authentication protocol is a sender policy framework (SPF) authentication protocol or a domain keys identified mail (DKIM) authentication protocol.

6. The system of claim 1, wherein the additional information searched by the computing server is generated by one or more Internet searches.

7. The system of claim 1, wherein the data of the DMARC report indicating successes or failures related to one or more authenticating protocols, the authenticating protocols comprising a sender policy framework (SPF) authentication and a domain keys identified mail (DKIM) authentication.

8. The system of claim 1, wherein the guided workflow includes a step to add a domain keys identified mail (DKIM) key to be associated with the entity.

9. The system of claim 1, wherein the guided workflow includes a step to an identifier of the entity to a sender policy framework (SPF) record.

10. A computer-implemented method, comprising:
  maintaining, by a computing server, a plurality of guided workflow plans, at least one of the guided workflow plans comprising one or more steps associated with setting up a policy;
  receiving, by the computing server, a Domain-based Message Authentication, Reporting and Conformance (DMARC) report associated with a first domain, the computing server being delegated by the first domain to receive, on behalf of the first domain, the DMARC report, wherein the first domain is associated with one or more DMARC policies specifying how emails purportedly originated from the first domain are handled, the DMARC report comprising data of IP addresses attempting to send one or more emails on behalf of the first domain to an recipient server generating the report;
identifying an entity in the data of the DMARC report;
identifying metadata associated with the entity;
searching additional information to determine a nature of the entity;
selecting, based on the additional information, an applicable guided work plan from the plurality of guided workflow plans; and
causing a graphical user interface to present, according to the applicable guided work plan, a guided workflow for setting up a policy to be associated with the entity.

11. The computer-implemented method of claim 10, wherein the plurality of guided workflow plans comprise a first guided workflow plan for setting up an authentication protocol.

12. The computer-implemented method of claim 10, wherein the plurality of guided workflow plans comprise a second guided workflow plan for authorizing an entity.

13. The computer-implemented method of claim 10, wherein the entity is identified as a sender that fails an authentication protocol.

14. The computer-implemented method of claim 13, wherein the authentication protocol is a sender policy framework (SPF) authentication protocol or a domain keys identified mail (DKIM) authentication protocol.

15. The computer-implemented method of claim 10, wherein the additional information searched by the computing server is generated by one or more Internet searches.

16. The computer-implemented method of claim 10, wherein the data of the DMARC report indicating successes or failures related to one or more authenticating protocols, the authenticating protocols comprising a sender policy framework (SPF) authentication and a domain keys identified mail (DKIM) authentication.

17. The computer-implemented method of claim 10, wherein the guided workflow includes a step to add a domain keys identified mail (DKIM) key to be associated with the entity.

18. The computer-implemented method of claim 10, wherein the guided workflow includes a step to an identifier of the entity to a sender policy framework (SPF) record.

19. A non-transitory computer-readable medium configured to store computer code comprising instructions, the instructions, when executed by one or more processors, cause the one or more processors to:
maintain a plurality of guided workflow plans, at least one of the guided workflow plans comprising one or more steps associated with setting up a policy;
receive a Domain-based Message Authentication, Reporting and Conformance (DMARC) report associated with a first domain, wherein the first domain delegates a computing server to receive, on behalf of the first domain, the DMARC report, wherein the first domain is associated with one or more DMARC policies specifying how emails purportedly originated from the first domain are handled, the DMARC report comprising data of IP addresses attempting to send one or more emails on behalf of the first domain to an recipient server generating the report;
identify an entity in the data of the DMARC report;
identify metadata associated with the entity;
search additional information to determine a nature of the entity; and
select, based on the additional information, an applicable guided work plan from the plurality of guided workflow plans; and
cause a graphical user interface to present, according to the applicable guided work plan, a guided workflow for setting up a policy to be associated with the entity.

20. The non-transitory computer-readable medium of claim 19, wherein the entity is identified as a sender that fails an authentication protocol, and wherein the authentication protocol is a sender policy framework (SPF) authentication protocol or a domain keys identified mail (DKIM) authentication protocol.

* * * * *